(12) United States Patent
Gilchrist

(10) Patent No.: US 12,172,326 B2
(45) Date of Patent: Dec. 24, 2024

(54) ROBOTIC TRANSPORT SYSTEM AND METHOD THEREFOR

(71) Applicant: HIGHRES BIOSOLUTIONS, INC., Beverly, MA (US)

(72) Inventor: Ulysses Gilchrist, Reading, MA (US)

(73) Assignee: HIGHRES BIOSOLUTIONS, INC., Beverly, MA (US)

( * ) Notice: Subject to any disclaimer, the term of this patent is extended or adjusted under 35 U.S.C. 154(b) by 0 days.

(21) Appl. No.: 18/474,893

(22) Filed: Sep. 26, 2023

(65) Prior Publication Data

US 2024/0091943 A1 Mar. 21, 2024

Related U.S. Application Data

(63) Continuation of application No. 17/476,249, filed on Sep. 15, 2021, now Pat. No. 11,766,781, which is a continuation of application No. 17/032,011, filed on Sep. 25, 2020, now Pat. No. 11,123,870.

(60) Provisional application No. 62/907,297, filed on Sep. 27, 2019.

(51) Int. Cl.
*B25J 9/16* (2006.01)
*B25J 13/00* (2006.01)
*B25J 13/08* (2006.01)

(52) U.S. Cl.
CPC .............. *B25J 9/1676* (2013.01); *B25J 9/161* (2013.01); *B25J 9/1666* (2013.01); *B25J 9/1694* (2013.01); *B25J 13/006* (2013.01); *B25J 13/088* (2013.01)

(58) Field of Classification Search
CPC ........ B25J 9/1676; B25J 9/161; B25J 9/1666; B25J 9/1694; B25J 13/006; B25J 13/088; B25J 9/0096; B25J 9/162; B25J 19/027; B25J 5/007; B25J 9/042; B25J 13/086; G05B 2219/39091

See application file for complete search history.

(56) References Cited

U.S. PATENT DOCUMENTS

| | | |
|---|---|---|
| 3,680,085 A | 7/1972 | Del Signore |
| 4,958,068 A | 9/1990 | Pong et al. |
| 5,247,306 A | 9/1993 | Hardange et al. |

(Continued)

FOREIGN PATENT DOCUMENTS

| | | |
|---|---|---|
| DE | 102008063081 | 8/2010 |
| JP | S61252096 | 11/1986 |

(Continued)

*Primary Examiner* — Basil T. Jos
(74) *Attorney, Agent, or Firm* — Perman & Green, LLP

(57) ABSTRACT

A robotic transport system including a drive section connected to a frame. An articulated arm coupled to the drive section providing the arm with arm motion in a collaborative space, corresponding to the frame, from a first location, in which the arm has a first shape, to another different location of the arm in the collaborative space in which the arm has another different shape. An electromagnetic affection envelope borne by the arm so that the electromagnetic affection envelope is defined by the arm and is close coupled and substantially conformal to at least part of a dynamic contour of each different arm shape of the arm. A controller connected to the drive section and configured so that in response to detection of entry of a collaborative object into the electromagnetic affection envelope, the controller commands a change in at least one predetermined characteristic of the arm motion.

21 Claims, 19 Drawing Sheets

(56) References Cited

U.S. PATENT DOCUMENTS

| | | |
|---|---|---|
| 5,668,452 A | 9/1997 | Villarreal et al. |
| 5,907,395 A | 5/1999 | Schulz et al. |
| 6,023,064 A | 2/2000 | Burgin |
| 6,739,635 B2 | 5/2004 | Byun |
| 8,961,537 B2 | 2/2015 | Leung et al. |
| 9,296,106 B2 | 3/2016 | Schlaich et al. |
| 9,707,043 B2 * | 7/2017 | Bozung .............. A61B 17/3423 |
| 9,919,425 B2 | 3/2018 | Bushman et al. |
| 10,295,331 B2 | 5/2019 | Magnus et al. |
| 2012/0277915 A1 | 11/2012 | Jacobsen et al. |
| 2013/0184980 A1 | 7/2013 | Kentaro et al. |
| 2013/0226344 A1 | 8/2013 | Wong et al. |
| 2014/0247116 A1 | 9/2014 | Davidson |
| 2018/0000546 A1 | 1/2018 | Crawford et al. |
| 2018/0120852 A1 | 5/2018 | Cho |
| 2018/0214100 A1 | 8/2018 | Kumar |
| 2018/0222050 A1 | 8/2018 | Vu et al. |
| 2019/0054637 A1 | 2/2019 | Asada et al. |
| 2019/0061165 A1 | 2/2019 | Rajendran et al. |
| 2019/0014352 A1 | 5/2019 | Miyazawa et al. |
| 2019/0147655 A1 | 5/2019 | Galera et al. |
| 2019/0193267 A1 | 6/2019 | Peng et al. |
| 2019/0242916 A1 | 8/2019 | Guarracina et al. |
| 2019/0262993 A1 | 8/2019 | Cole et al. |
| 2020/0180162 A1 | 6/2020 | Roziere et al. |
| 2020/0289221 A1 | 9/2020 | Denlinger et al. |

FOREIGN PATENT DOCUMENTS

| | | |
|---|---|---|
| JP | 2005288657 | 10/2005 |
| JP | 2012245575 | 12/2012 |
| JP | 2013246553 | 12/2013 |
| JP | 2014501179 | 1/2014 |
| JP | 6339134 | 6/2018 |
| JP | 2018103345 | 7/2018 |
| WO | 2010072193 | 7/2010 |
| WO | 20180131237 | 7/2018 |
| WO | 20190042784 | 3/2019 |

* cited by examiner

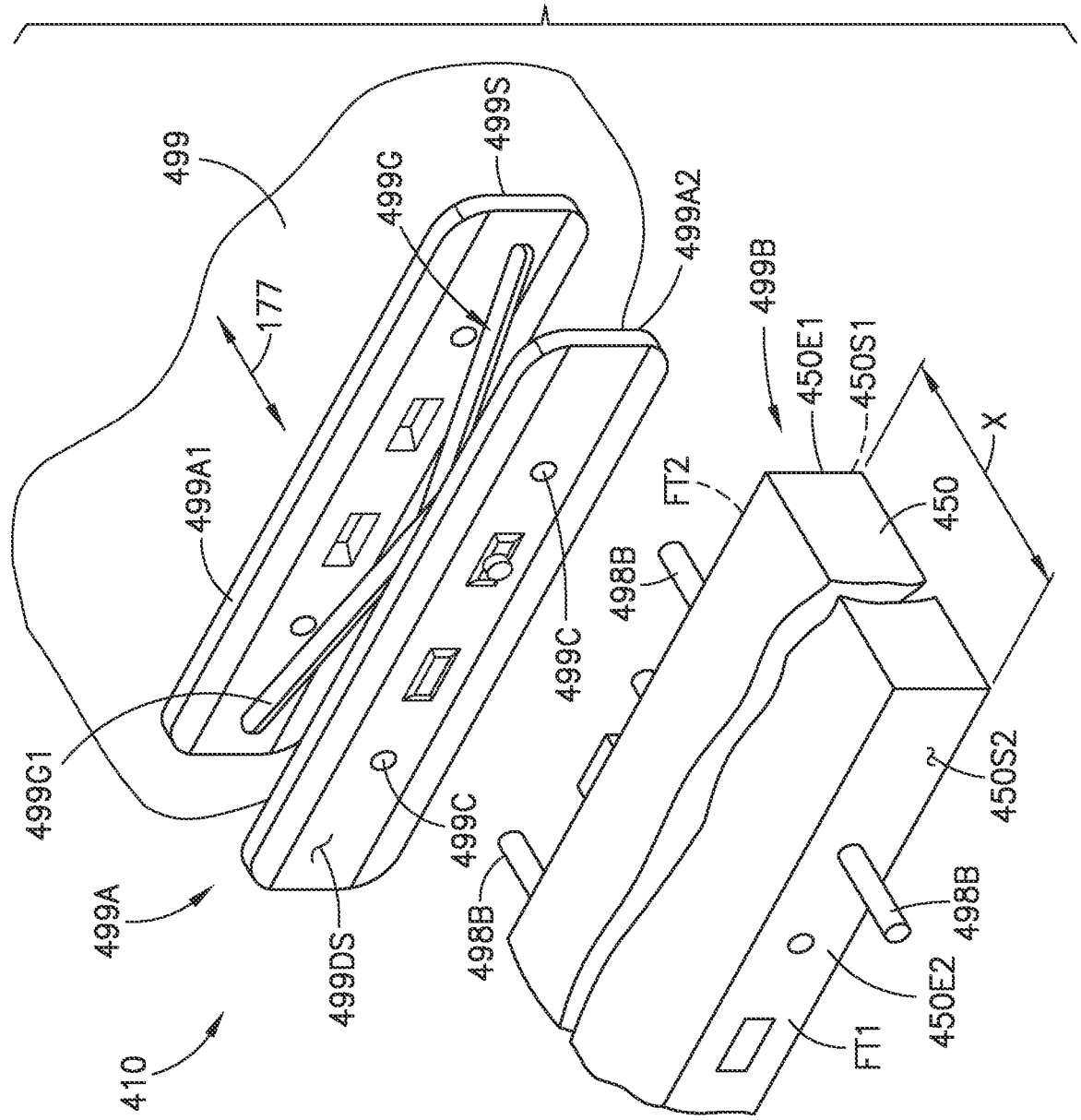

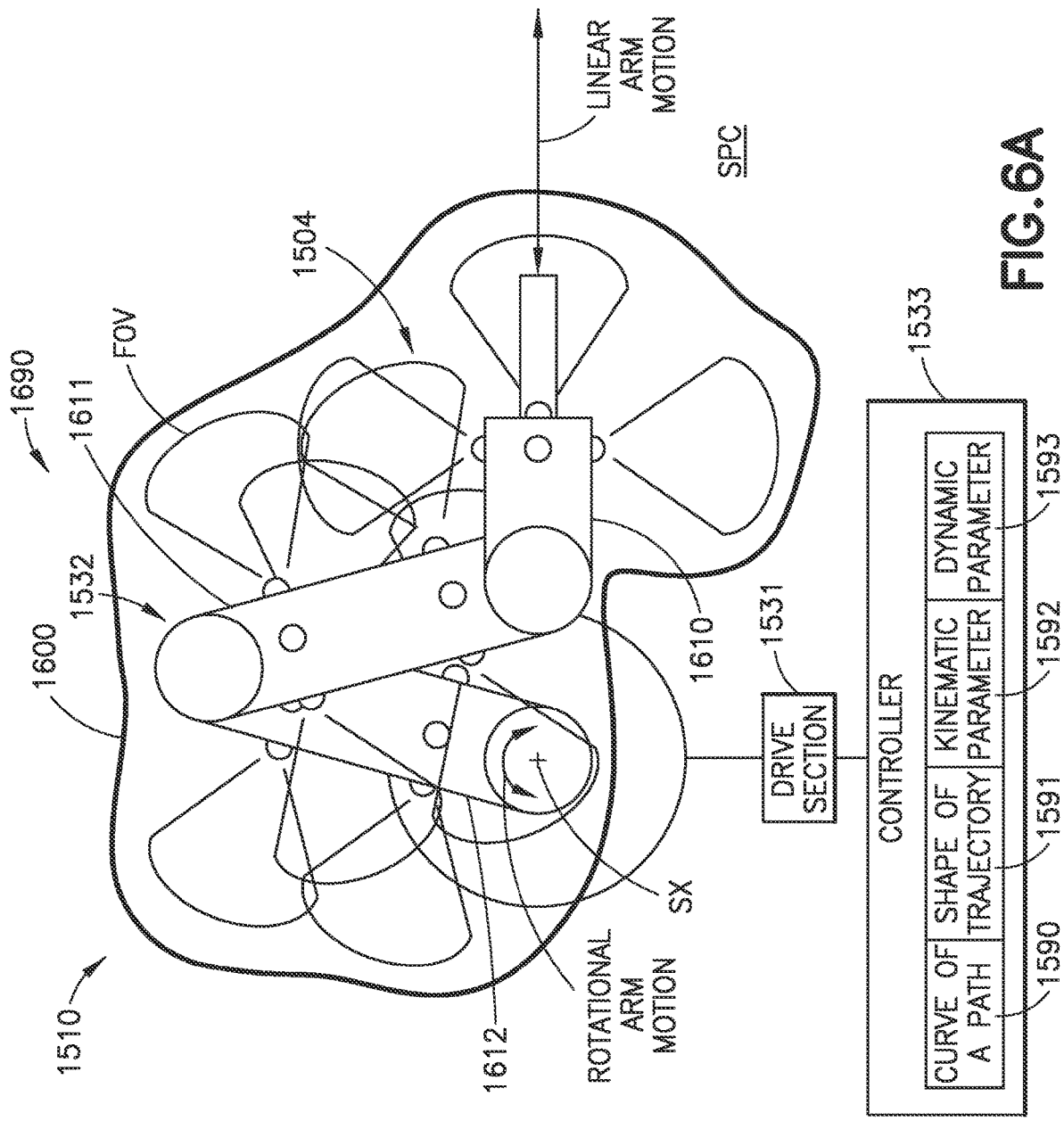

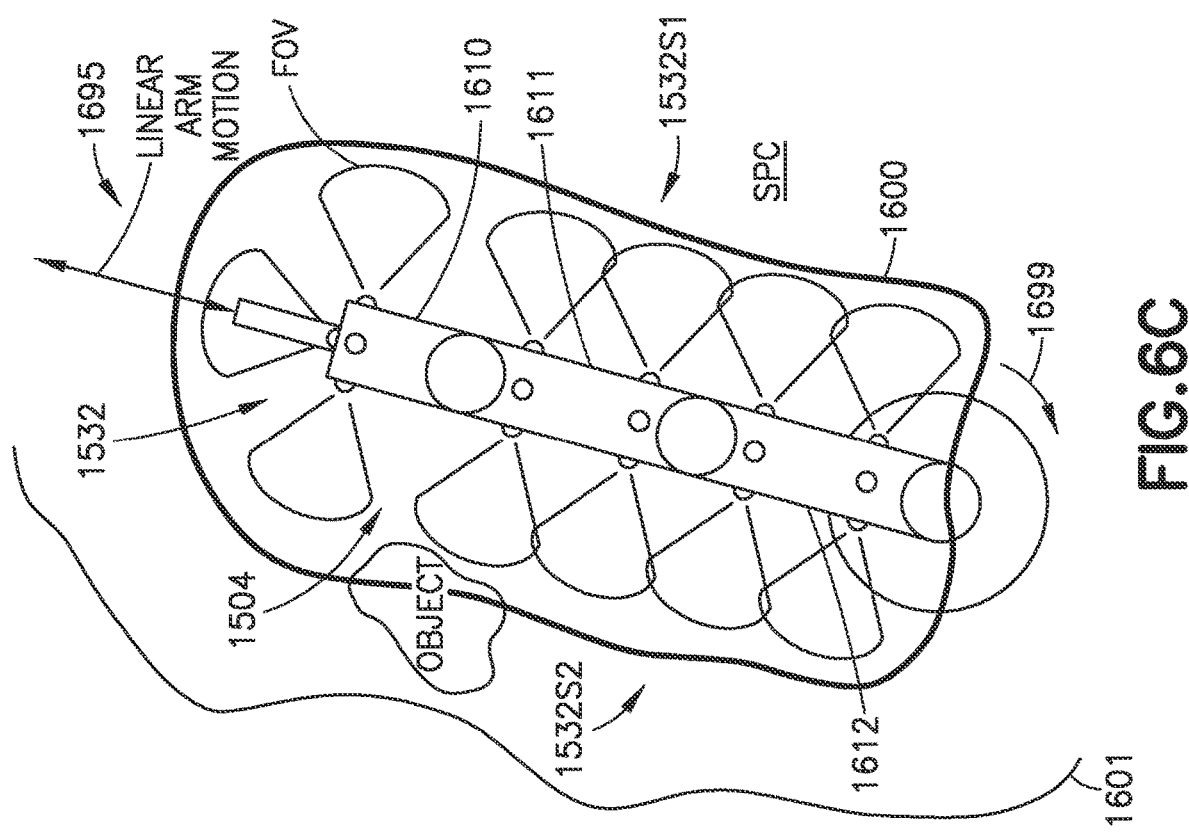

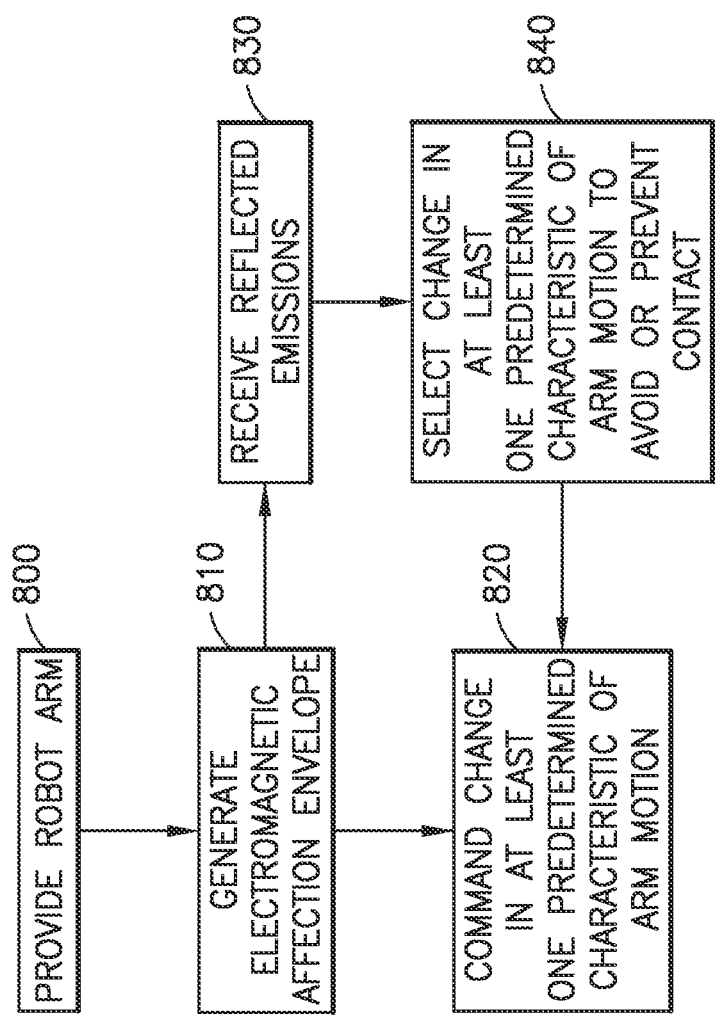

ure are explained in the following description, taken
ROBOTIC TRANSPORT SYSTEM AND METHOD THEREFOR

CROSS-REFERENCE TO RELATED APPLICATIONS

This application is a continuation of U.S. Non-Provisional patent application Ser. No. 17/476,249, filed Sep. 15, 2021, (now U.S. Pat. No. 11,766,781), which is a continuation of U.S. Non-Provisional patent application Ser. No. 17/032,011, filed Sep. 25, 2020, (now U.S. Pat. No. 11,123,870), which is a non-provisional of and claims the benefit of U.S. Provisional Patent Application No. 62/907,297, filed Sep. 27, 2019, the disclosures of which are incorporated herein by reference in their entireties.

BACKGROUND

1. Field

The present disclosure generally relates to life sciences equipment, and more particularly, to automated handling and processing of life sciences processing equipment.

2. Brief Description of Related Developments

In one example, conventional operation of automated equipment employed in a collaborative environment includes the use of physical and/or electronic barriers disposed around the automated equipment so as to prevent interference with the operation of other automated equipment or humans within the collaborative environment. The physical barriers may include fencing, railings, or other blockades that may restrict human access to an operating zone or area of the automated equipment. These physical barriers may include switches or sensors that are coupled to the automated equipment and which shut down the automated equipment upon a breach of the physical barriers. In other aspects, electronic barriers may be employed which include light curtains that may be coupled to the automated equipment so as to shut down the automated equipment upon a breach of the light curtain.

These physical and/or electronic barriers are typically installed around at least a portion of the automated equipment where it may take a significant amount of time to set up, calibrate, and certify the physical and/or electronic barriers for use prior to operation of the automated equipment. Each time the automated equipment is moved to a different location, the physical and/or electronic barriers are taken down and reinstalled at the different location. Moreover, as the physical and/or electronic barriers are fixed in place around at least part of the automated equipment, there may be ways to defeat the effectiveness of the barriers (e.g., such as climbing over a fence or rail, etc. passing through an area where there may be inadequate light curtain coverage, etc.).

In another example, conventional collaborative laboratory spaces rely on range sensing system arrays that are either fixed, or commutable (such as resident on an automated guided vehicle or robot arm) and employ broad space illumination such as infrared illumination. In the case of infrared illumination, whether in a fixed or commutable array, all sensors (emitters) are "lit" up or otherwise activated to illuminate a whole region of coverage of the array to detect all objects in the region of coverage. Here all objects in the region of coverage are detected whether the objects present a probable or potential engagement object in vehicle/robot arm transit or an improbable potential engagement object in view of vehicle or robot arm motion.

The validation of a collaborative workspace such as with "fixed validation areas" as noted above (whether fixed in the sense of physical/electronic barriers or a sensing array that detects/senses the presence of any and all objects in the validation area) is unsatisfactory with respect to available motions of the vehicle/robot arm in that sensing any and all objects defeats the collaboration between, for example, humans and the vehicles/robot arms.

BRIEF DESCRIPTION OF THE DRAWINGS

The foregoing aspects and other features of the present disclosure are explained in the following description, taken in connection with the accompanying drawings, wherein:

FIGS. 4A-4B are isometric views of a portion of a docking station of the robotic processing system in accordance with aspects of the present disclosure;

FIGS. 6A-6C are schematic illustrations of a movement sequence of a robot arm incorporating collaborative robot guarding system in accordance with aspects of the present disclosure;

FIG. 8 is a flow diagram of a method in accordance with aspects of the present disclosure;

DETAILED DESCRIPTION

Figure 1A:
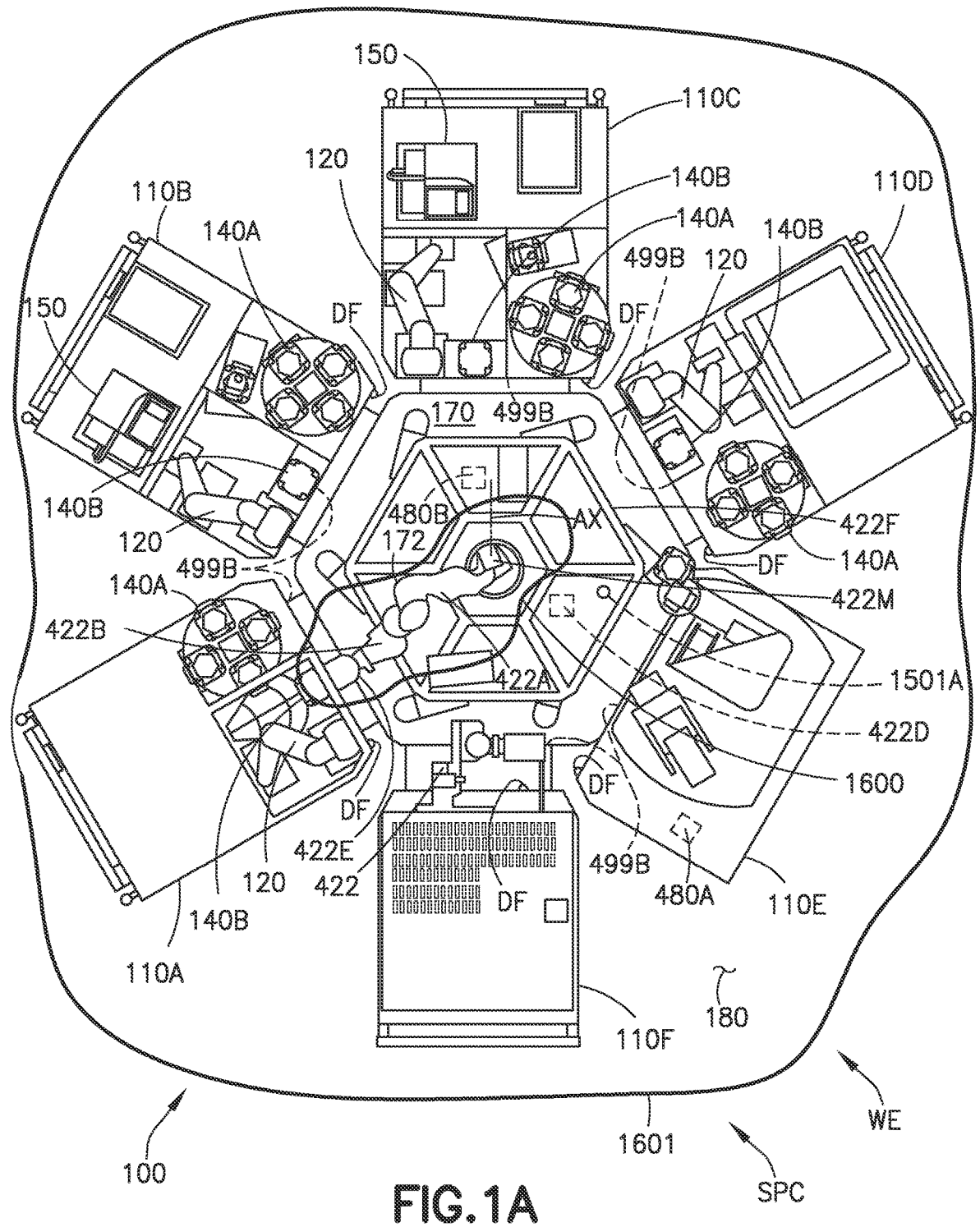
FIGS. 1A and 1B are schematic illustrations of a robotic processing system in accordance with one or more aspects of the present disclosure.
Figure 1B:
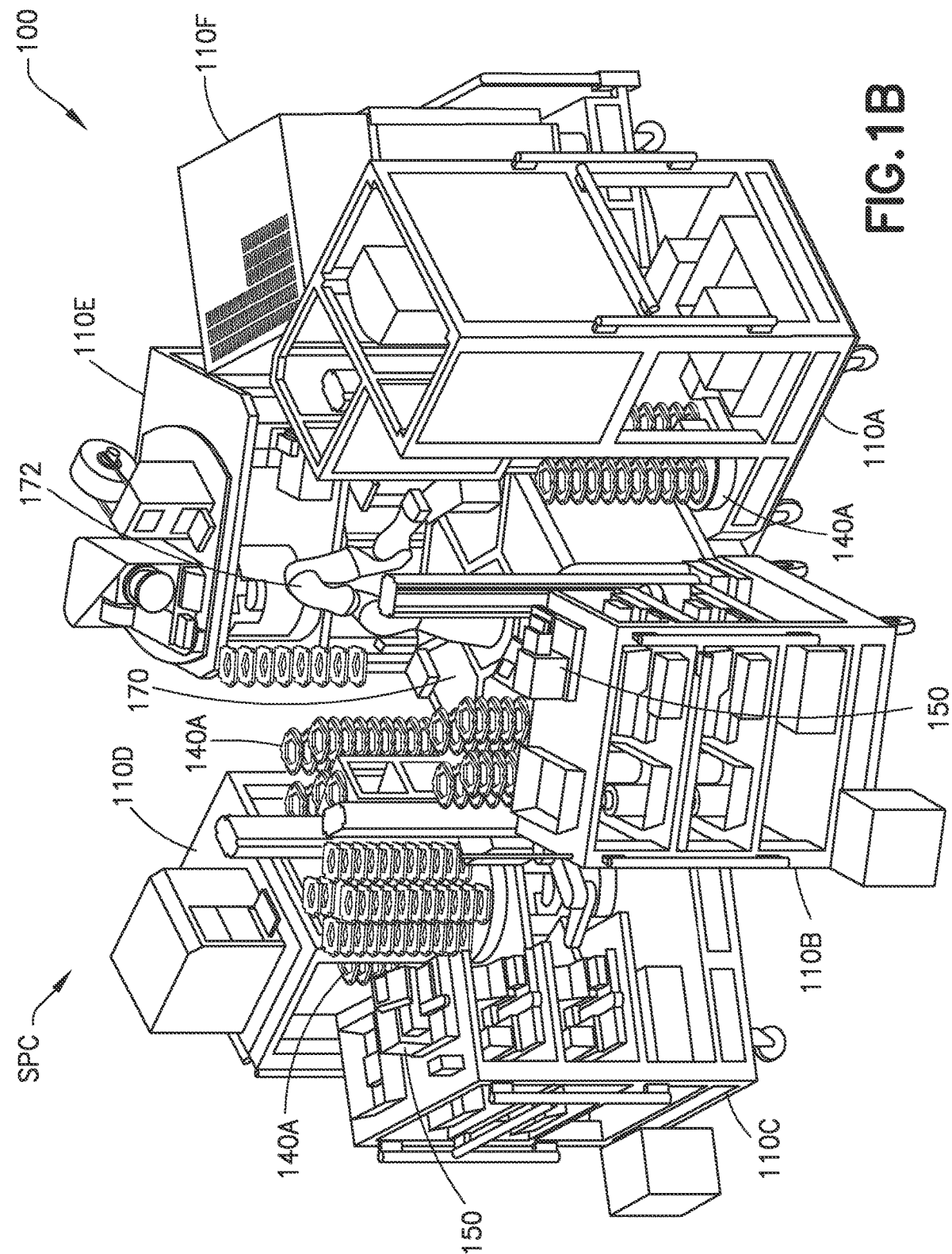
Figure 1C:
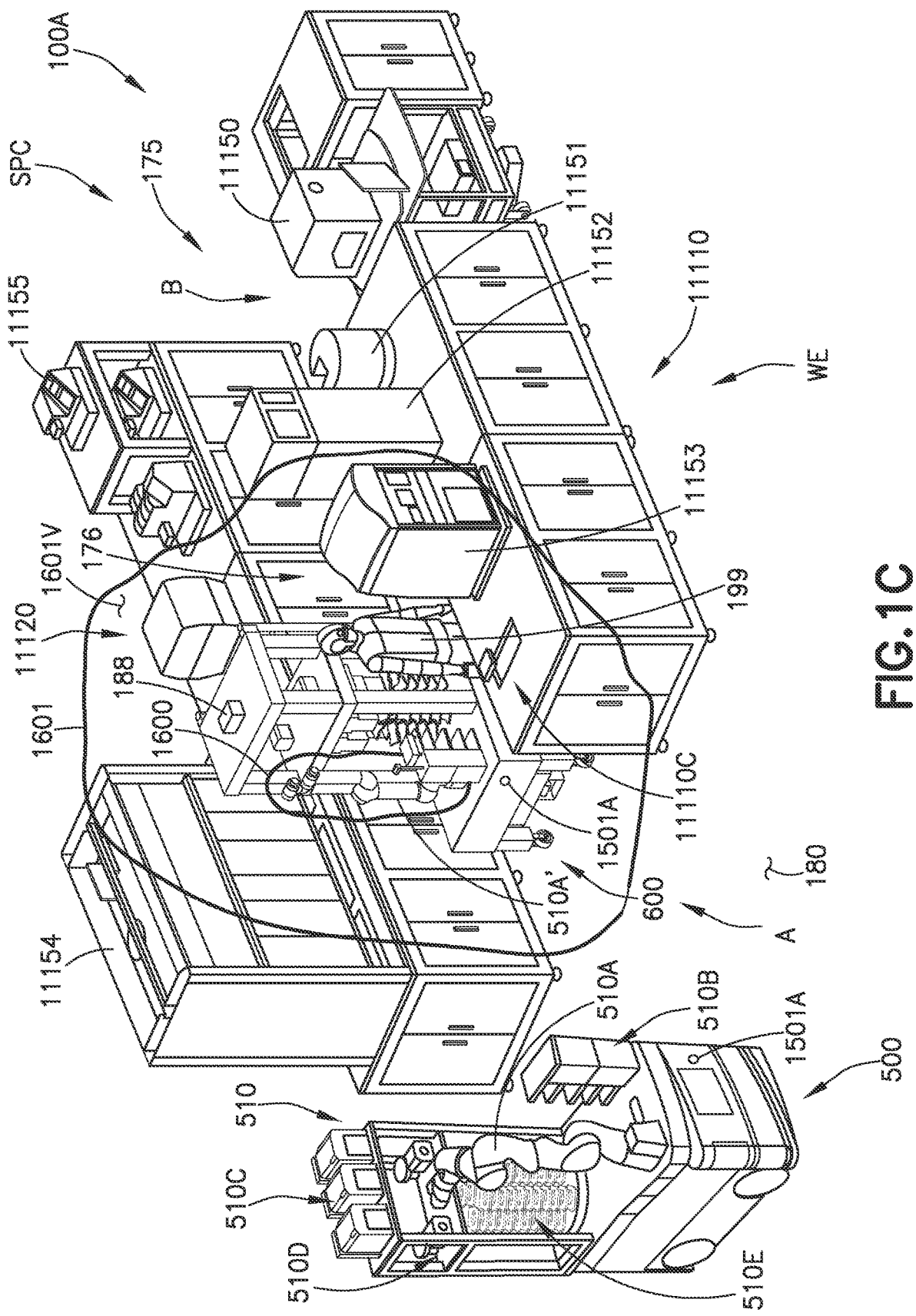
FIG. 1C is a schematic illustration of a laboratory facility in accordance with aspects of the present disclosure.

FIGS. 1A-1C illustrate exemplary collaborative operating environments or spaces SPC in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

The aspects of the present disclosure provide for a collaborative robot guarding system that utilizes radar sensors borne by the collaborative robot for the detection of obstacles and humans within, for example, the collaborative operating space SPC (the collaborative operating environment SPC forming at least a portion of a workspace environment WE). For example, the collaborative robot may include an articulated arm (such as one or more of articulated arms 120, 172, 422, 510A, 510A' described herein) to which the radar sensors are mounted. The articulated arm, in in some aspects, is mounted to and borne by a relocatable cart, such as those described herein, that form interchangeable stations with "plug and play" interfaces at different selectable workstations; and in other aspects the articulated arm may form a portion of a variably configurable system with selectably variable emergent stations as described herein. The articulated arm may act as a waveguide for the radar sensors so as to define a dynamic guarding zone or electromagnetic affection envelope (e.g., that encloses the articulated arm) that is close coupled (i.e., dynamic to robot arm motion and shape) with the arm such that the scan of each radar sensor (whether a continuous wave scan or repetitive pulse scan) can be singularly repeated based on arm motion characteristics so as to effect agile environment scanning or a scan of the environment that is tuned to motion characteristics of the articulated arm. Here the electromagnetic affection envelope moves and/or changes direction as the portion or portions of the articulated arm, to which the radar sensors are mounted, moves. As such, in one aspect, each movable portion of the articulated arm may bear a multitude of radar sensors for generating a respective electromagnetic affection envelope.

Detection information from the respective radar sensors may be used individually, in groups, or in their totality as inputs by any suitable controller of the articulated arm to determine whether the articulated arm may move from a current locations to a target location. The controller may be configured to use the detection information from the radar sensors to determine alterations in a predetermined articulated arm trajectory due to, for example, obstructions or humans within the path of the predetermined articulated arm trajectory.

In one aspect, the radar sensors may be millimeter wave (mmWave) radar sensors, however in other aspects any suitable sensors may be employed. As will be described herein, the controller may use the inputs from the millimeter wave radar sensors to effect articulated arm obstacle avoidance and trajectory planning, adjusting in process articulated arm trajectories, and/or predicting movement of and detecting collaborative occupants (e.g., humans or other automation) based on inputs from the millimeter wave radar.

In accordance with the aspects of the present disclosure, the agile/tuned scanning of the electromagnetic affection envelope provides for selectably positioning the articulated arm (which may be disposed on a movable cart, e.g., cart-borne) at pre-existing or emergent stations within a collaborative space that has different and variable topology characteristics (e.g., the aspects of the present disclosure enable changes with respect to adding/removing workstations, and/or adding/removing/replacing carts with articulated arms thereon).

Referring to FIGS. 1A and 1B, in one aspect, a collaborative operating space SPC are provided in robotic processing system 100. One or more mobile carts 110A-110F of the robotic processing system 100 are located within the collaborative operating space SPC. The robotic processing system 100 may also include an automated system 170, disposed in the collaborative operating space SPC, to which the one or more mobile carts 110A-110F are operably interfaced. Each of the mobile carts 110A-110F may include one or more of a robotic transport arm 120, 422, one or more workpiece holding stations 140A, 140B, an operator interface 150, and any other suitable instrumentation, processing and/or storage equipment suitable for interfacing with the workpiece(s) handled by the robotic processing system 100. As may be realized, a user or operator may access one or more regions of the collaborative operating space SPC (e.g. interface 150, one or more holding stations 140A, 140B, or other location on the mobile carts 110) directly, and at times such access may be coincident or coexistent with robotic transport arm 120, 172, 422 operation within the collaborative operating space SPC (see also FIG. 1C described below). For example, an operator may place or pick a workpiece on or from a holding station 140A, 140B in anticipation of a robotic pick of that workpiece as an aspect of a collaborative action with the robotic transport arm 120, 422, 172. Accordingly, in some aspects, the robotic transport arm 120, 422, 172 and operator collaborate in the collaborative operating space SPC. In one aspect, each of the mobile carts 110A-110F includes one or more datum surfaces or features DF that are in a known spatial relationship with a sensor (or other detectable feature) of a respective mobile cart 110A-110F. In one aspect, the features (such as robotic transport arms 120, workpiece holding stations 140A, 140B, and any other instrumentation/equipment) of each mobile cart 110A-110F are in a known relationship with the one or more datum surfaces or features DF where the robotic processing system 100 may include a device or tool for sending a signal indicating the position of the mobile cart features to the automated system 170 as described in, for example, United States Patent Publication No. 2011/0270445 A1 published on Nov. 3, 2011 and entitled "Instrument Turntable and Method for Use", the disclosure of which is incorporated herein in its entirety. In one aspect, the one or more datum surfaces or features DF are detected by the collaborative robot guarding system 1550 (FIG. 5) for automated calibration/setup of system components for operation with the robotic transport system 1500 (FIG. 5 or any of the robot arms/transports described herein, one or more of which include collaborative robot guarding systems such as described herein with respect to at least FIG. 5).

In one aspect, the automated system 170 includes any suitable robotic transport arm 172 for accessing one or more features of the one or more mobile carts 110A-110F. In one aspect, the robotic transport arm may be a selective compliant articulated robot arm (SCARA arm) or any other arm suitable articulated for transporting workpieces in the collaborative space SPC. For example, the robotic transport arm 172 may be configured to access the workpiece holding stations 140A, 140B, interface with the robotic transport arms 120, 422, or interface/access any other suitable instrumentation/processing equipment of the one or more mobile carts 110A-110F as described in United States Patent Publication No. 2011/0270445 A1 published on Nov. 3, 2011 and entitled "Instrument Turntable and Method for Use", the disclosure of which is incorporated herein in its entirety. In one aspect, the automated system 170 is configured as a cluster tool and has a hexagonal configuration where six mobile carts are operably interfaced with six facets of the automated system 170. In other aspects, the automated system 170 may have any number of facets (e.g. pentagonal, octagonal, rectangular, etc.) so that any suitable number of mobile carts 110A-110F may be interfaced with the automated system 170. In other aspects, two or more robotic processing systems may be operably coupled to each other in any suitable manner such as described in U.S. patent application Ser. No. 15/689,986 filed Aug. 29, 2017 (and published on Mar. 1, 2018 as United States pre-grant publication number 2018/0056528), U.S. Pat. Nos. 7,560,071, 8,734,720, and 8,795,593, the disclosures of which are incorporated herein by reference in their entireties.

Referring to FIG. 1C, another collaborative operating space SPC is illustrated in a laboratory facility 100A that may include at least one auto-navigating robotic processing vehicle 500, 600 and at least one processing station 11110, 11120. In one aspect, the laboratory facility 100A may be substantially similar to that described in U.S. patent application Ser. No. 16/265,258 filed on Feb. 1, 2019 and entitled "Auto-navigating Robotic Processing Vehicle", the disclosure of which is incorporated herein by reference in its entirety. The at least one processing station 11110, 11120 may be a human operated processing station and/or an automated processing station. As described herein, the auto-navigating robotic processing vehicles 500, 600 include a processing section 510 that has a number of different processing modules 510A-510G. Each of the different processing modules 510A-510G has a different predetermined laboratory processing function with a different predetermined function characteristic corresponding to the processing module 510A-510G. The different processing modules 510A-510G and their respective functions are automatically selectable to effect, independent of or in combination with vehicle travel, a preprocess or a preprocess condition of laboratory samples and/or sample holders with respect to a process at the at least one processing station 11110, 11120. For example, preprocessing conditions that may be performed by the at least one auto-navigating robotic processing vehicle 500, 600 include, but are not limited to, storage of sample trays, sample tray lids, transport and direct or indirect handoff of laboratory equipment (e.g., vacuum heads, brushes, Bunsen burners, microscopes, brooms, processing tools and/or fixtures, sample trays, etc.) to a human 199 (at a processing station 11110, 11120) and/or automated processing equipment at a processing station 11110, 11120, cleaning of an animal cage, laboratory table, etc., Examples of processes that may be performed by the at least one auto-navigating robotic processing vehicle 500, 600 include, but are not limited to, removing a sealing film from a sample and/or sample tray, reading an identification of a sample and/or sample tray, etc., pipetting fluids, capping and decapping tubes.

In one aspect, the at least one auto-navigating robotic processing vehicle 500, 600 services individual processing stations 11110, 11120, where the processing stations 11110, 11120 have either automatic item (e.g., tools, samples, trays, etc.) input/output or have manual processes which are carried out/effected, monitored, and/or controlled (e.g., through a user interface) by a human 199. In one aspect, the at least one auto-navigating robotic processing vehicle 500, 600 is configured to provide all comporting (e.g., suitable) equipment (e.g., "process payloads" which may include process modules, peripherals, and/or consumables for station engagement, or "workpiece payloads" which may include samples and sample trays for station engagement) on the auto-navigating robotic processing vehicle 500, 600 to perform the tasks at a given processing station 11110, 11120. As an example, an auto-navigating robotic processing vehicle 500, 600 may be configured and loaded for an individual task such that all the comporting equipment is carried by a single auto-navigating robotic processing vehicle 500, 600 to complete the individual task (which may be, e.g., a process station function) in full with a single auto-navigating robotic processing vehicle 500, 600 and the items carried thereon.

Figure 2:
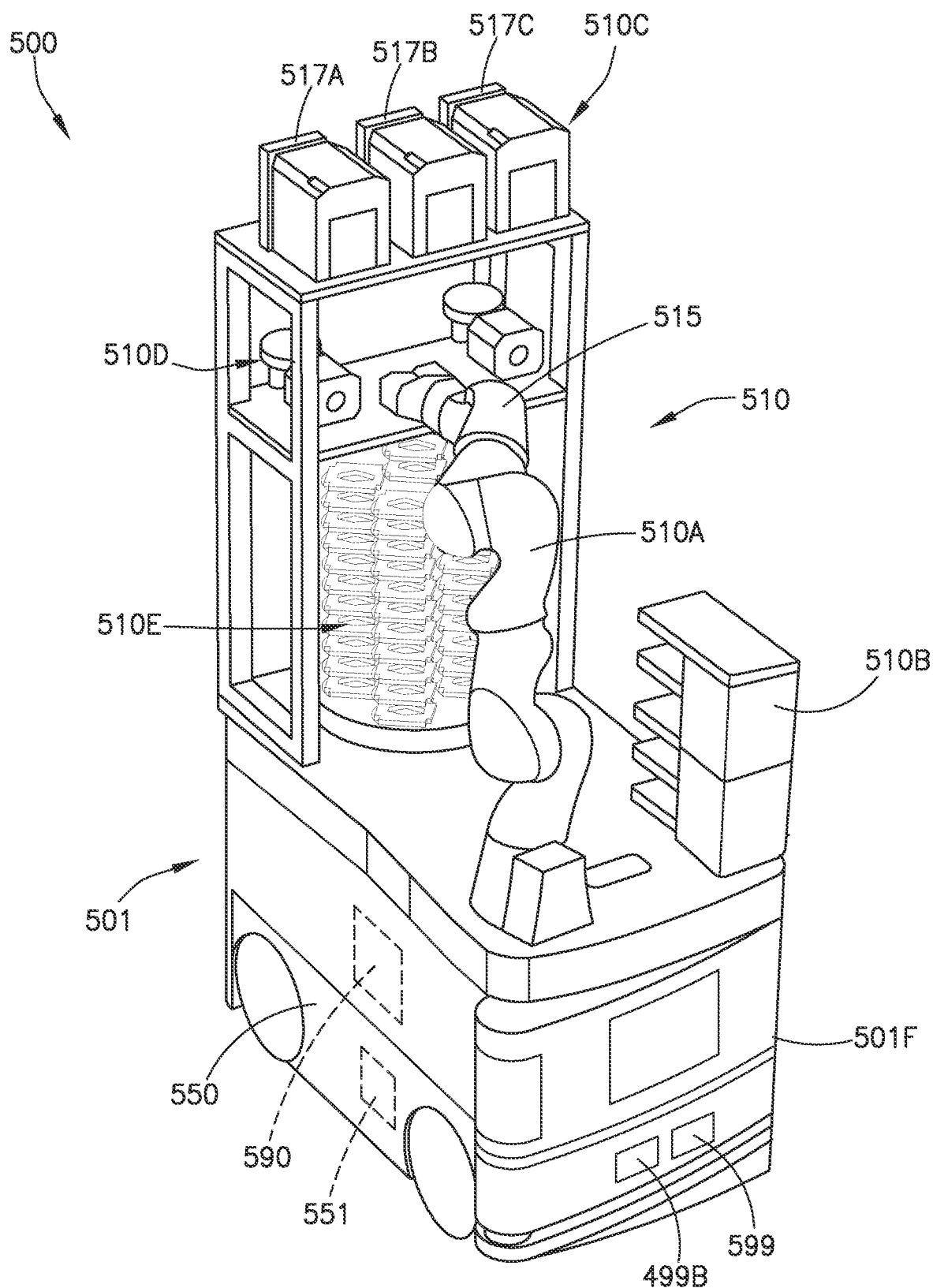
FIG. 2 is a schematic illustration of an auto-navigating robotic processing vehicle in accordance with aspects of the present disclosure.

The at least one auto-navigating robotic processing vehicle 500, 600 may also provide or otherwise generate, at each different human affectable process station 11110, 11120 (e.g., that has a common type of station process function, that includes one or more manual steps such as human affectable processes that include sterilization, exact timing control, climate control, temperature control, unattended use, remote control or monitoring) repeatable or "near identical" process steps (e.g., the process steps are performed with automatic machine repetition controlled by the at least one auto-navigating robotic processing vehicle's 500, 600 programmable controller 590—see FIG. 2)).

Still referring to FIG. 1C, the processing stations 11110, 11120 may be linearly arranged with one or more process tools 11150-11155 which may include, but are not limited to, electronic pipettes, microplate dispensers, media preparation modules (e.g., sterilization and dispensing of sample medium), environmental control modules (e.g., refrigeration, freezers, incubators, clean environments, hoods, etc.), storage modules, and centrifuges. It is noted that FIG. 1C illustrates human processing stations 11110, 11120 which may or not include automated processes however, the aspects of the present disclosure are not limited to the human processing stations 11110, 11120. For example, the at least one auto-navigating robotic processing vehicle 500, 600 may also be configured to effect one or more predetermined laboratory processing function at a processing station of an automated configurable processing tool such as that described above with respect to FIGS. 1A and 1B in a manner substantially similar to that described in U.S.s patent application Ser. No. 16/265,258 filed on Feb. 1, 2019 and entitled "Auto-navigating Robotic Processing Vehicle", the disclosure of which was previously incorporated by reference herein in its entirety.

Referring to FIG. 2, an auto-navigating robotic processing vehicle 500 is illustrated in accordance with aspects of the present disclosure. The auto-navigating robotic processing vehicle 500 includes a carriage 501 having a frame 501F, an autonomous drive section 550, a processing section 510, and a controller 590.

The autonomous drive section 550 is connected to the frame 501F and is configured to traverse (e.g., move) the carriage 501 effecting vehicle travel on and across a facility floor 180 (see, e.g., FIGS. 1A and 1C), on which the at least one processing station 11110, 11120 (FIG. 1C) and/or automated system(s) 170 (FIGS. 1A and 1B) are disposed for processing laboratory samples and/or sample holders. An autonomous navigation section 551 of the auto-navigating robotic processing vehicle 500 is communicably connected to the autonomous drive section 550 so as to effect autonomous navigation vehicle travel with the autonomous drive section 550 on the facility floor 180. The autonomous navigation section 551 may include any suitable sensors (e.g., line following, inertial navigation, GPS, stereoscopic vision sensors, etc.) and/or programming so that the auto-navigating robotic processing vehicle 500 moves along the facility floor 180 and interfaces with a human 199 (FIG. 1C) and/or a processing module 11151-11155 of a processing station 11110, 11120 (FIG. 1C), or a tool formed by automated system 170 (FIGS. 1A and 1B).

In one aspect, the autonomous navigation section 551 is configured so that the auto-navigating robotic processing vehicle 500 travels to the at least one processing station 11110, 11120 (FIG. 1C) and/or automated system 170 (FIGS. 1A and 1B) through a human access zone 175 (FIG. 1C) on the facility floor 180, with a human 199 present in the human access zone 175. As an example, the auto-navigating robotic processing vehicle 500 is a collaborative vehicle such that the autonomous navigation section 551, and at least portions of the processing section 510, include suitable speed controls, and any suitable sensors for detecting torque/force applied by the auto-navigating robotic processing vehicle 500 automation (e.g., the processing section 510 and/or the autonomous drive section 550) and sensing obstacles within a path of the auto-navigating robotic processing vehicle 500. In one or more aspects, the obstacle detection system of the auto-navigating robotic processing vehicle may be substantially similar to the collaborative robot guarding system 1550 (FIG. 5) described herein such that millimeter wave radar sensors map the collaborative space SPC and increase/decrease a detection range depending on a presence of objects in the collaborative space SPC. In other aspects, the collaborative robot guarding system 1550 may form part of the obstacle detection system of the auto-navigating processing vehicle 500 and at least in part effects navigation of the auto-navigating processing vehicle 500 through the collaborative space SPC.

One example of collaboration between the auto-navigating robotic processing vehicle 500 and a human 199 is where the auto-navigating robotic processing vehicle 500 is configured to travel in a processing zone 176 on the facility floor 180 with the at least one processing station located 11110, 11120 in the processing zone 176, and a human access zone 175 is disposed in at least part of the processing zone 176 providing human access to a common portion 11110C of the at least one processing station 11110, 11120 engaged by a robot arm 510A of the auto-navigating robotic processing vehicle 500. In one aspect, the auto-navigating robotic processing vehicle 500, via robot arm function, and the human 199 effect a collaborative function to the common portion 11110C of the at least one processing station 11110, 11120 where the human 199 and auto-navigating robotic processing vehicle 500 work together to complete a task, such as for example, changing a pipetting head at the common portion 11110C of the at least one processing station 11110, 11120 where the robot arm 510A hands off the pipetting head to the human 199. In another aspect, the auto-navigating robotic processing vehicle 500, via robot arm function, and the human 199 effect a common function to the common portion 11110C of the at least one processing station 11110, 11120, such as for example, the robot arm function automatically changes the pipetting head at the common portion 11110C of the at least one processing station 11110, 11120 while the human 199 operates the pipetting tool (with the pipetting head installed by the auto-navigating robotic processing vehicle 500) to transfer samples to/from, e.g., sample trays.

In another aspect, the autonomous navigation section 551 is configured so that the auto-navigating robotic processing vehicle 500 travels to the at least one processing station 11110, 11120 (FIG. 1C) and/or automated system(s) 170 (FIGS. 1A and 1B) through the human access zone 175 on the facility floor 180, wherein the human access zone 175 is secured so as to block human access to the human access zone 175. In this aspect, the auto-navigating robotic processing vehicle 500 may or may not include collaborative automation, such as described herein. The human access zone 175 may be secured so as to block human access in any suitable manner such as with physical barriers, light curtains (e.g., which when broken shut down the at least one auto-navigating robotic processing vehicle within the human access zone 175), etc. and include any suitable interlocks that may shut down the at least one auto-navigating robotic processing vehicle within the human access zone 175 when the interlock is not engaged.

The processing section 510 includes a number of different processing modules 510A-510G connected to and carried by the carriage frame 501F. Each of the different processing modules 510A-510G have a different predetermined laboratory processing function with a different predetermined function characteristic corresponding to the processing module 510A-510G. For example, the processing modules 510A-510G may include one or more robot arms 510A, a sample tray lid remover 510B, a pipetting head module 510C (suitable examples of pipetting heads can be found in U.S. Pat. No. 9,623,405 issued on Apr. 18, 2017 the disclosure of which is incorporated herein by reference in its entirety), an end effector processing module 510D, a sample tray carousel 510E, a bar code scanner 510F (FIG. 3A), a sample plate orientation module 510G (FIG. 3A), and/or any other suitable sample processing equipment and/or tools. The sample tray carousel 510E may be substantially similar to that described in U.S. Patent Application No. 62/625,809 filed on Feb. 2, 2018, entitled "Robotic Processing System" and U.S. patent application Ser. No. 16/265,273 filed on Feb. 1, 2019, entitled "Robotic Processing System", the disclosures of which are incorporated herein by reference in their entireties. Each of the different processing modules 510A-510G and their corresponding predetermined function are automatically selectable (such as in a manner substantially similar to that described in U.S. patent application Ser. No. 16/265,258 filed on Feb. 1, 2019 and entitled "Auto-navigating Robotic Processing Vehicle", the disclosure of which was previously incorporated by reference herein in its entirety) to effect automatically with the corresponding predetermined function, independent of or in combination with vehicle travel, a preprocess or preprocess condition (such as those described above) of one or more of the laboratory samples and sample holders with respect to a process at the at least one processing station 11110, 11120 and/or a processing station of the automated system 170.

Referring to FIGS. 1C and 2, the controller 590 is communicatively connected to each different processing module 510A-510G, so as to automatically select at least one processing module 510A-510G, from the different processing modules 510A-510G, and the corresponding predetermined function of the selected at least one processing module effecting automatically the preprocess or preprocess condition based on an identification of a travel location (such as a location of a processing station on the facility floor 180) for the auto-navigating robotic processing vehicle 500 and the process of the at the at least one processing station 11110, 11120. In one aspect, the controller 590 is configured so as to effect the autonomous navigation vehicle travel to the identified travel location (e.g., such as the location of the processing station 11110, 11120 on the facility floor 180), from an initial location (such as a charging location or any other suitable location) on the facility floor 180 different from the identified location. The controller 590 may also be configured to engage and effect with a first robot arm predetermined processing function an operation defining the preprocess or preprocess condition, and with the second robot arm predetermined processing function effect a processing station operation related to the preprocess or preprocess condition. For example, the controller 590 may effect picking up a manual tool such as an ultraviolet light from the initial location or the other suitable location and transport the ultraviolet light to the processing station 11110, 11120 where the controller effects, with the ultraviolet light held by the robot arm 510A sanitizing of the processing station 11110, 11120. The controller may also be communicatively connected to radar sensors borne on the robot arm 510A so as to form, at least in part, the collaborative robot guarding system as described in further detail herein.

Figure 3A:
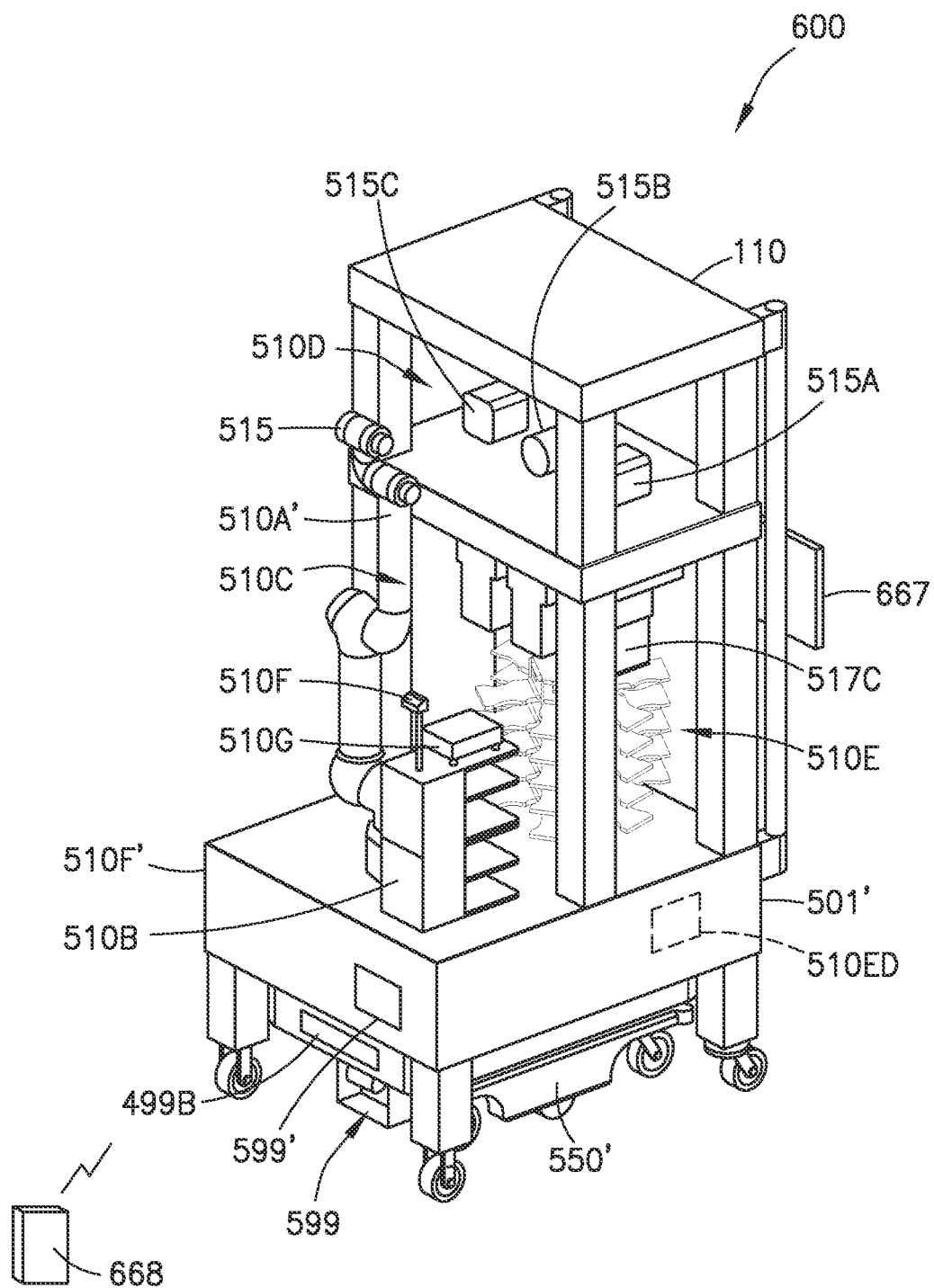
FIG. 3A-3C is a schematic illustration of an auto-navigating robotic processing vehicle in accordance with aspects of the present disclosure.

In one aspect, the controller 590 is configured (e.g., with any suitable non-transitory computer program code) to receive a command (from any suitable laboratory facility controller (e.g., such as a personal computer, a mobile device and/or a tablet computer—generally referred to as remote device 668, see FIG. 3A) identifying the travel location for the auto-navigating robotic processing vehicle 500, where, as noted above, the travel location corresponds to the at least one processing station 11110, 11120 and/or automated system 170. The controller 590 may also be configured to effect the automatic change of the robot arm predetermined processing function. For example, the controller 590 may cause the robot arm end 515 to select the anthropomorphic end effector 515C so that the robot arm 510A is able to open a door at the processing station 11110, 11120 and then select the tube gripping end effector 515A for transferring a sample tube through the open door at the processing station 11110, 11120.

In one aspect, the at least one processing station 11110, 11120 and/or automated system 170 may have different applications (which may correspond to, e.g., a preprocess and/or a preprocess condition) such as for example, general research laboratory operator/technician applications including, but not limited to, assay development, laboratory services, animal cage cleaning, mouse colony management, etc. In other aspects, the different applications may also include sample replication, sample retrieval, DNA (deoxyribonucleic acid) extraction and sequencing, cell culture operator, operator for work in BSL (biological safety level) 3 and 4 laboratories, clinical laboratory operator (including, e.g., sample accessioning and/or chemistry synthesis operator), and/or any other suitable laboratory applications. A separate auto-navigating robotic processing vehicle 500 may be provided for each of these different applications where each of the auto-navigating robotic processing vehicles 500 may have different robot arms, end effectors, shelving configurations, environmental housings, etc. than other auto-navigating robotic processing vehicles 500. For example, the auto-navigating robotic processing vehicle 500 may be configured to perform laboratory services and is equipped, as noted above, with pipetting heads 517A-517C, end effectors 515A-515C, a sample tray carousel 510E, and a sample tray lid remover 510B to perform a preprocess (e.g., removing sealing film from a tray/sample, reading a tray/sample identification, etc. as noted above) and/or a preprocess condition (tray lid removal and storage, sanitization, etc. as noted above), at the at least one processing station 11110, 11120.

Figure 3B:
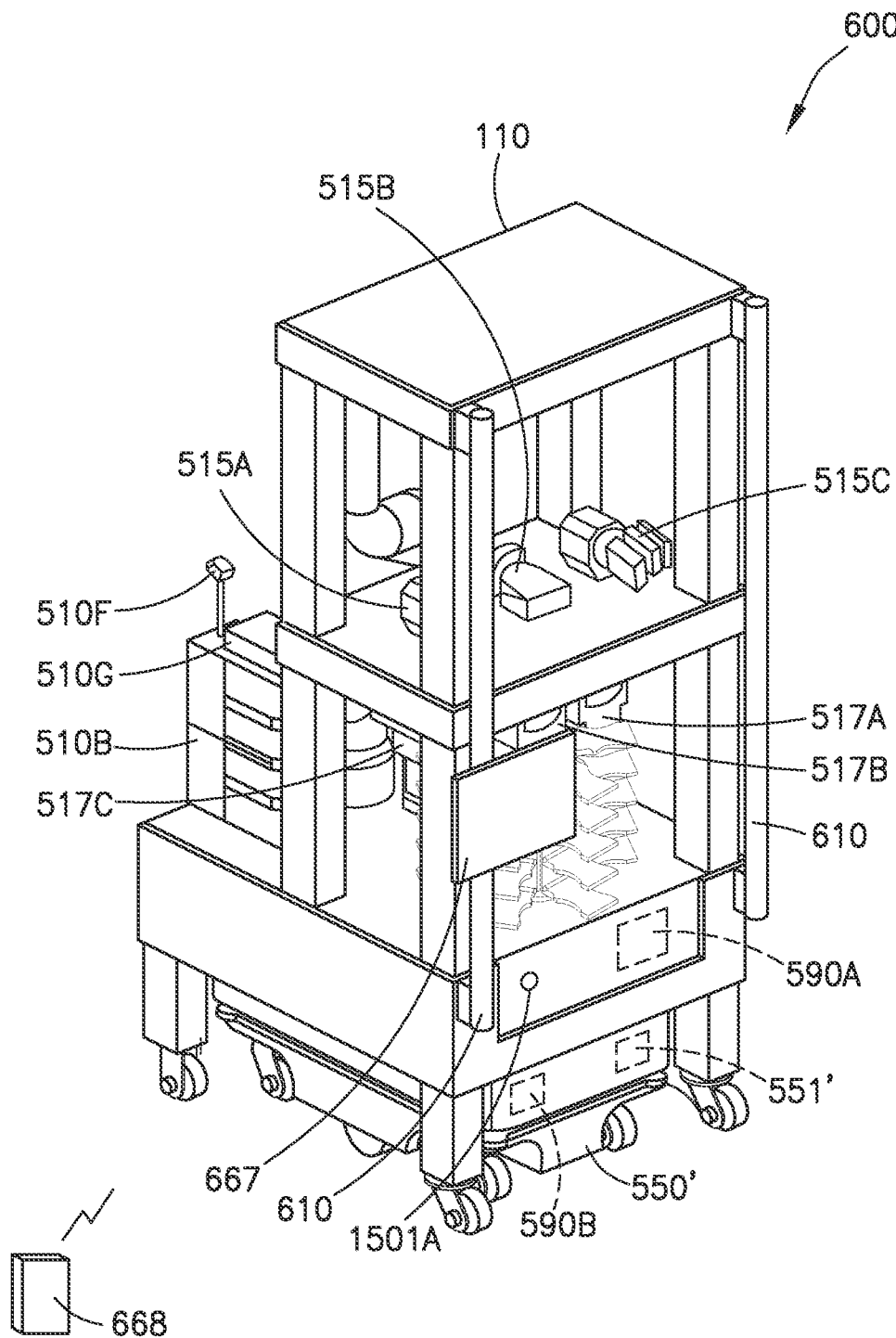
Figure 3C:
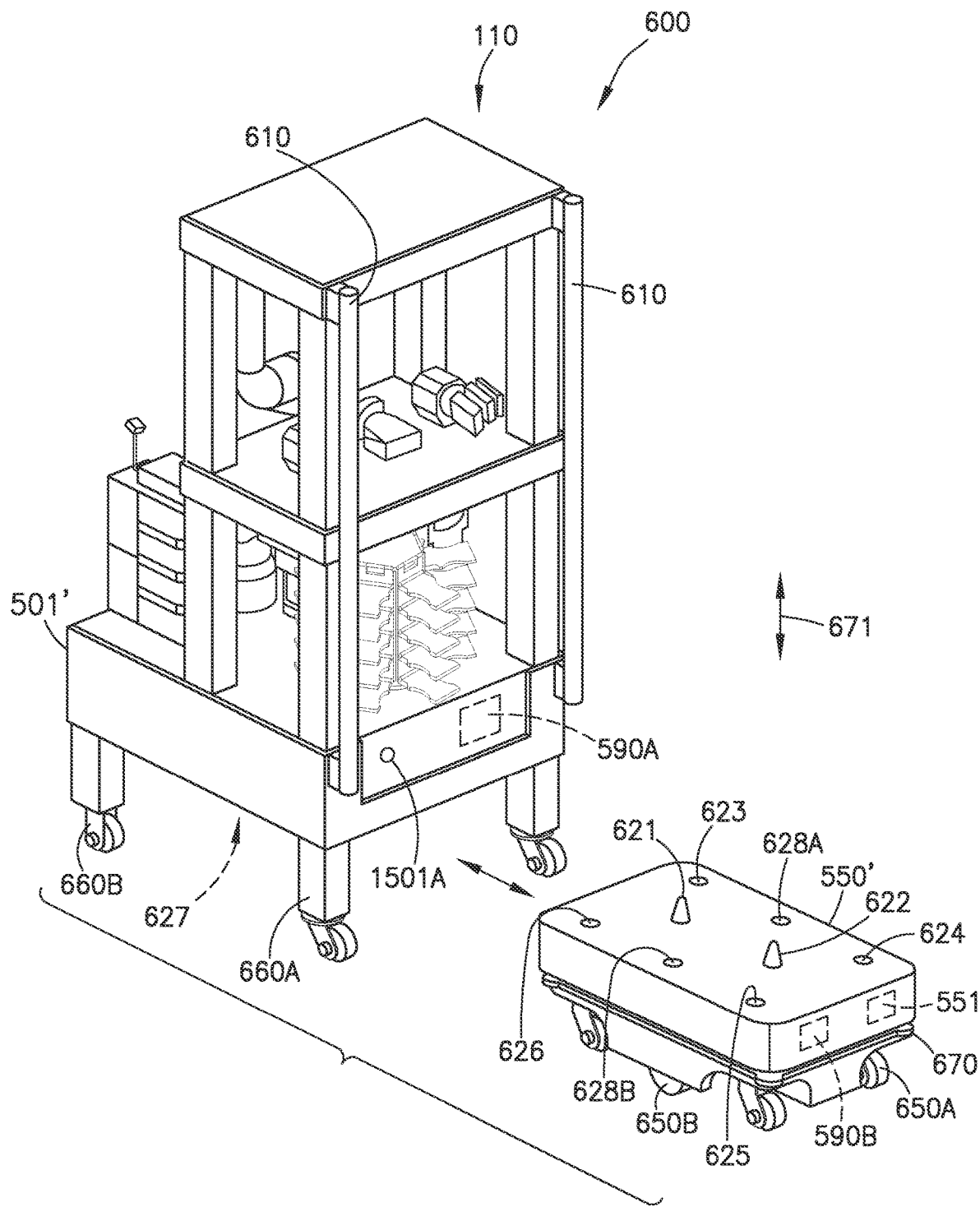

Referring now to FIGS. 3A-3C, an auto-navigating robotic processing vehicle 600 is illustrated. The auto-navigating robotic processing vehicle 600 may be substantially similar to auto-navigating robotic processing vehicle 500 described above but may be configured for a different processing and/or preprocessing condition application than the auto-navigating robotic processing vehicle 500. In this aspect, the auto-navigating robotic processing vehicle 600 includes carriage 501' and an autonomous drive section 550' that is separable from the carriage 501. In this aspect, the carriage 501 may be a collaborative carriage that may be moved across at least a portion of the facility floor 180 (FIGS. 1A and 1C) by a human 199 (FIG. 1C) using any suitable handles 610 coupled to the carriage frame 501F' and/or by the autonomous drive section 550'. In this aspect, the robot arm 510A' may be a different type of arm than the robot arm 510A of the auto-navigating robotic processing vehicle 500 such that the arms may provide a different number of degrees of freedom and/or a different type of articulated arm movement to effect the processes or preprocess conditions at the at least one processing station 11110, 11120. In other aspects, the robot arm of the auto-navigating robotic processing vehicle 600 may be the same arm as the arm 510A.

As best illustrated in FIG. 3C, the autonomous drive section includes one or more carriage engagement features 621-626 configured to couple with corresponding engagement features 627 on the underside of the carriage frame 501F'. The one or more carriage engagement features 621-626 may include kinematic couplings, electrical couplings, fluid couplings and/or any other suitable couplings that when coupled provide for one or more of movement of the autonomous drive section 550' and the carriage 501' as a unit, powering one or more of the processing modules 510A-510G, providing communication between the controller 590 and one or more of the processing modules 510A-510G and otherwise effecting a preprocess or a preprocess condition performed by one or more of the processing modules 510A-510G. In one aspect, electrical power, a fluid flow source, and control commands may be provided to the carriage 501' by the autonomous drive section 550'. In another aspect, the carriage 501' may include one or more of the power source and the fluid flow source. In one aspect, each of the carriage 501' and the autonomous drive section 550' may include a controller 590A, 590B that may communicate with each other or operate independent of each other for traversing the carriage 501' along the facility floor 180 and for operating one or more of the processing modules 510A-510G.

The autonomous drive section 550' includes any combination of at least a pair of drive wheels 650B and any suitable number of caster wheels 650A. The carriage 501' includes a pair of fixed (e.g., non-pivotable about a vertical axis) wheels 660B and a pair of caster (e.g., pivotable about a vertical axis) wheels 660A (or any suitable combination of fixed wheels and caster wheels, or all caster wheels, or all fixed wheels). The autonomous drive section 550' may be configured such that coupling engagement between the autonomous drive section 550' and the carriage 501' does not lift the wheels 660A, 660B of the carriage 501' off of the facility floor 180. Here the weight of the carriage 501' may be supported at least in part by the wheels 660A, 660B of the carriage 501' when the autonomous drive section 550' is coupled to the carriage 501'. The wheels 660A, 660B of the carriage 501' and the wheels 650A, 650B of the autonomous drive section 550' may be configured to allow the autonomous drive section 550' to traverse the carriage 501' along the facility floor 180 in straight line movement, around corners or along any other suitable path of movement. In one aspect the wheels may be configured to allow the autonomous drive section to pivot the carriage 501' substantially without linear traverse of the carriage 501'.

In one aspect, the autonomous drive section 550' may include a coupling feature drive 670 that moves the carriage engagement features 621-626 in direction 671 towards and away from the carriage 501' for coupling and decoupling with the corresponding coupling features 627 of the carriage 501'. In other aspects, coupling between the carriage engagement features 621-626 and the corresponding coupling features 627 may be performed in any suitable manner (e.g., such as with actuated clamps, pins, etc.). In one aspect, the autonomous drive section 550' includes any suitable sensors 628A, 628B for detecting any suitable features of the carriage 501' for aligning the carriage engagement features 621-626 and the corresponding coupling features 627 (e.g., through movement of the autonomous drive section 550').

Figure 4A:
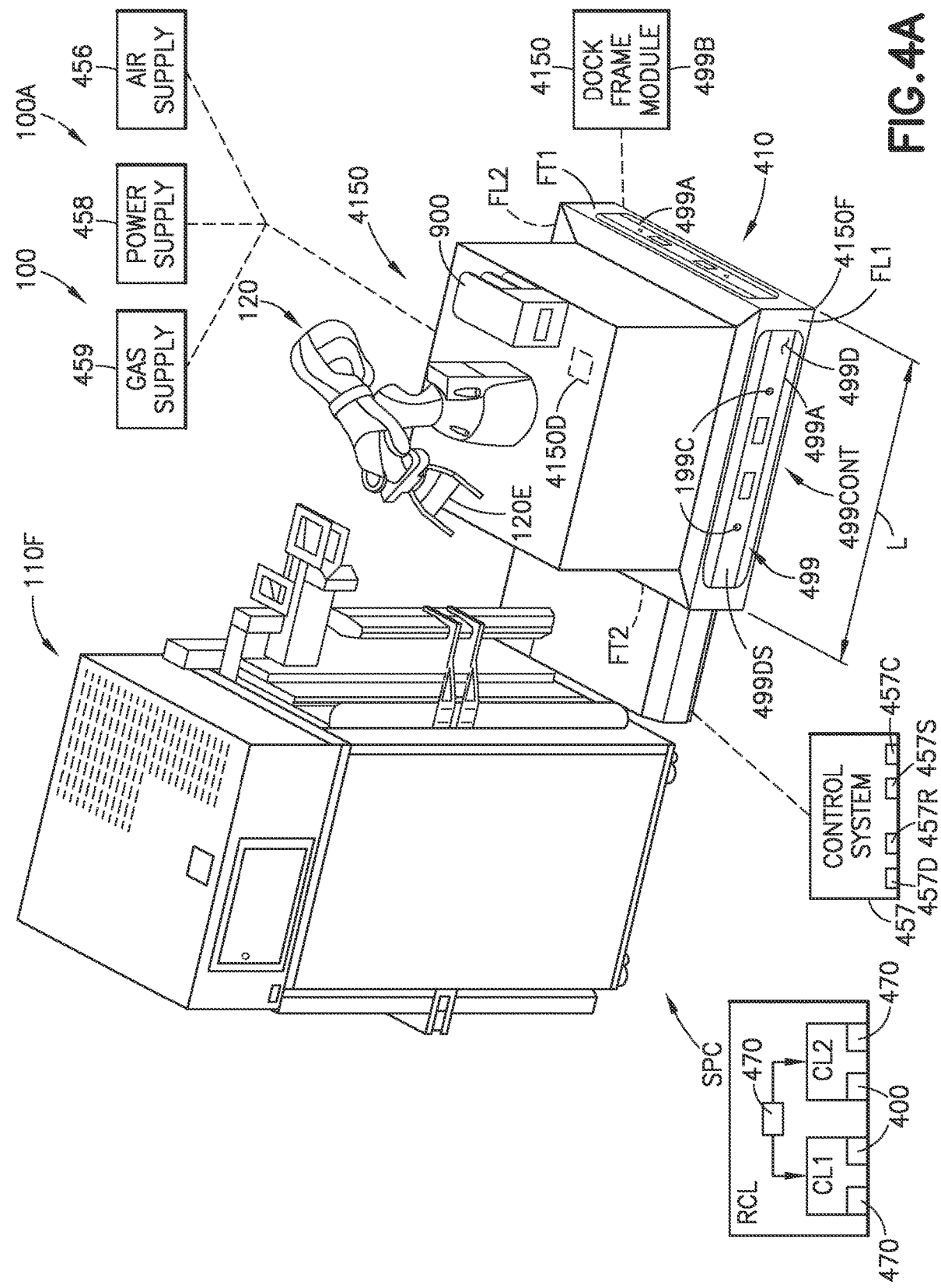

Referring to FIG. 4A, in one aspect, the robotic processing system 100, 100A may be disposed in any suitable collaborative operating space SPC. In one aspect, the collaborative operating space SPC is a space in which at least a portion of the robotic processing system 100A collaborates with human operators 199 (see FIG. 1C) for carrying out testing and experiments. In other aspects the space in which the robotic processing system 100 operates may be substantially free of human operators (see FIGS. 1A and 1B). Where the operating space SPC is collaborative, a human operator may access one or more regions of the collaborative operating space SPC (e.g. a location on mobile carts, any suitable workpiece holding location, etc.) directly, and at times such access may be coincident or coexistent with a robotic transport arm 120 (also referred to herein as a robot or robot arm) operation within the collaborative operating space SPC. For example, an operator may place or pick a workpiece on or from a workpiece holding station in anticipation of a robotic pick of that workpiece as an aspect of a collaborative action with the robotic transport arm 120. Accordingly the robotic transport arm 120 and operator collaborate in the collaborative operating space SPC in some aspects.

In one aspect, the robotic processing system 100, 100A includes a dock frame 499 and at least one dock frame module 4150. The dock frame 499 includes at least one docking interface 499A configured to couple to and interface with at least one automated, at least in part, laboratory instrumentation and a storage cabinet (e.g., such as mobile carts 110A-110F, auto-navigating robotic processing vehicle 500, 600, or any other suitable interchangeable carts, tables, racks, and the instrumentation provided thereon as described in, for example, U.S. patent application Ser. No. 16/265,273 filed on Feb. 1, 2019 and entitled "Robotic Processing System", the disclosure of which is incorporated herein by reference in its entirety), so as to operably couple the at least one of the laboratory instrumentation and the storage cabinet to the dock frame 499 via the docking interface 499A.

Referring to FIGS. 4A and 4B, each of the at least one dock frame module 4150 is interchangeable with at least another dock frame module 4150, and has control features 499CONT (FIG. 4A) with a predetermined relationship to a reference datum 4150D of the dock frame module 4150 and with a reference datum 499D of the dock frame 499. In one aspect, the reference datum 499D of the dock frame 499 may be a location established by a seating surface 499S of the dock frame 499 (e.g., on which the docking interface is seated) and the control features 499CONT (such as such as pins or apertures 499C and/or surface 499DS) of the docking interface 499S. The reference datum 4150D of the dock frame module 4150 maybe located at any suitable location on the dock frame module 4150 from which operations of the dock frame module 4150 are referenced. For example, the reference datum 4150D of the dock frame module 4150 may be a mounting location of the robot 120, a mounting location of a nest 900 (e.g., for holding samples or other labware) or other position on the dock frame module 4150 from which a location of the robot 120 and/or nest 900 is determined (e.g., the robot 120 and/or nest 900 have a known spatial relationship with the reference datum 4150D).

To couple one dock frame module 4150 to another dock frame module 4150 to form or otherwise define a spine structure 410 with a variably elongated configuration, a coupling unit 450 (FIG. 4B) may be provided. The coupling unit 450 includes a first end 450E1 and a second end 450E2 each forming a docking interface 499B that reciprocally mates with docking interface 499A. For example, the docking interface 499B on each end 450E1, 450E2 has control features 499B that form a reference datum of the coupling unit 450. The control features may be disposed in a common plane so that the mating of the docking interface 499B on the first end 450E1 of the coupling unit 450 with the docking interface 499A of a first dock frame module 4150 and the mating of the docking interface 499B on the second end 450E2 of the coupling unit 450 with the docking interface 499A of a second dock frame module 4150 aligns the first and second dock frame modules 4150 with each other to select the variably elongated configuration and longitudinal length L of the spine structure 410 formed by the dock frame(s) 499 as described in U.S. patent application Ser. No. 16/265,273 filed on Feb. 1, 2019 and entitled "Robotic Processing System", the disclosure of which was previously incorporated herein by reference in its entirety.

The coupling unit 450 may also have a predetermined distance between seating surfaces 450S1, 450S2 of the docking interfaces 499B on the first and second ends 450E1, 450E2 so that the reference datums 450D of the first and second dock frame modules 4150 are in predetermined known spatial relationship with one another. In other aspects the docking interfaces 499A of the dock frame modules 4150 may be configured to provide for substantially direct coupling between dock frame modules 4150 in any suitable manner that effects a predetermined known spatial relationship between the reference datums 450D of the first and second dock frame modules 4150. The known spatial relationship between the different dock frame modules 4150 effects controlled placement of, for example, robotic slides (e.g., along which a robot 120 may traverse) or other processing equipment, on the different dock frame modules 4150 so the robotic slides or other processing equipment spans across two or more of the different dock frame modules 4150 in a predetermined known relationship with respect to the reference datums 450D of the different dock frame modules 4150.

As described herein, the spine structure 410 formed by the dock frame(s) 499 has a selectably variable longitudinal length L. The selectably variable length L is selected by adding or removing dock frame modules 4150 to or from other dock frame modules 4150. Here the dock frame 499, and docking interface(s) 499A included therewith, of each dock frame module 4150 are arranged to provide true interchangeability between the dock frame modules 4150. For example, the dock frame 499 may be provided with position and inclination control surfaces and features FL1, FL2, FT1, FT2 (represented in FIG. 4A). In one aspect, the position and inclination control surfaces and features FL1, FL2, FT1, FT2 may be disposed on or formed by the docking interface 499A but in other aspects the position and inclination control surfaces and features FL1, FL2, FT1, FT2 may be formed by any suitable portion of the dock frame 499. The position and inclination control surfaces and features FL1, FL2, FT1, FT2 may be of any suitable kind, such as kinematic coupling features (e.g., such as control features 499CONT in the form of pins or apertures 499C and/or surface 499DS) or any other suitable relaxed coupling features that effect alignment between two components.

The position and inclination control surfaces and features FL1, FL2, FT1, FT2 are configured to repeatably position one dock frame 499 (and corresponding dock frame module 4150) relative to another dock frame 499 (and corresponding dock frame module 4150). The position and inclination control surfaces and features FL1, FL2, FT1, FT2 are also configured to repeatably position the mobile carts 110A-110F, auto-navigating robotic processing vehicle 500, 600, or any other suitable (moving, stationary or fixed) interchangeable carts, tables, and/or racks to a dock frame 499 (and corresponding dock frame module 4150). As noted above, coupling unit 450 (FIG. 4B) may be employed for coupling two dock frames 499 to each other and includes a docking interface 499B that reciprocally mates with docking interface 499A of the dock frame 499. The mobile carts 110A-110F, auto-navigating robotic processing vehicle 500, 600, or any other suitable (moving, stationary or fixed) interchangeable carts, tables, and/or racks may also include docking interfaces 499B (see, e.g., FIGS. 1, 2, 3A). The docking interfaces 499B of the mobile carts 110A-110F, auto-navigating robotic processing vehicle 500, 600, or any other suitable (moving, stationary or fixed) interchangeable carts, tables, racks each include position and inclination control surfaces and features similar to those described above. The docking interfaces 499B of the coupling unit 450 may also include position and inclination control surfaces and features FT1, FT2 substantially similar to those described above.

As an example, the position and inclination control surfaces and features 499CONT of the docking interface 499A on the dock frame 499 defines a positioning reference basis/datum 499D of the dock frame 499 and the mating interface 499B of the coupling unit 450, or mobile carts 110A-110F, auto-navigating robotic processing vehicle 500, 600, or any other suitable (moving, stationary or fixed) interchangeable carts, tables, and/or racks with the docking interface 499A to locate the coupling unit 450, or mobile carts 110A-110F, auto-navigating robotic processing vehicle 500, 600, or any other suitable (moving, stationary or fixed) interchangeable carts, tables, and racks and provide the coupling unit 450, or mobile carts 110A-110F, auto-navigating robotic processing vehicle 500, 600, or any other suitable (moving, stationary or fixed) interchangeable carts, tables, racks with a kinematic (or relaxed) pose to repeatably position the coupling unit 450, or mobile carts 110A-110F, auto-navigating robotic processing vehicle 500, 600, or any other suitable (moving, stationary or fixed) interchangeable carts, tables, racks relative to the dock frame 499.

In one aspect, each of the mobile carts 110A-110F, each of the auto-navigating robotic processing vehicle 500, 600, and/or any other suitable (moving, stationary or fixed) interchangeable carts, tables, and racks includes one or more datum surfaces or features (such as similar to those of the docking interface 499B described above) that are in a known spatial relationship with a sensor (or other detectable feature) of a respective mobile cart 110A-110F. In one aspect, the features (such as robotic transport arms, workpiece holding stations and any other instrumentation/equipment) of each mobile cart 110A-110F are in a known relationship with the one or more datum surfaces or features where the robotic processing system 100, 100A may include a device or tool for sending a signal indicating the position of the mobile cart features to the dock frame module 4150 as described in, for example, United States patent publication number 2011/0270445 A1 published on Nov. 3, 2011 and entitled "Instrument Turntable and Method for Use", the disclosure of which was previously incorporated herein by reference in its entirety. Here the docking interface 499B of the mobile carts 110A-110F, auto-navigating robotic processing vehicle 500, 600, and/or or any other suitable (moving, stationary or fixed) interchangeable carts, tables, and racks substantially automatically sets a position of the mobile carts 110A-110F relative to the device or tool (such as the dock frame 499 and corresponding dock frame module 4150). The auto-navigating robotic processing vehicle 500, 600, and/or any other suitable (moving, stationary or fixed) interchangeable carts, tables, and/or racks may be similarly configured where the table support surfaces or supports of the racks are in a predetermined known spatial relationship with the docking interface 499B so that the docking interface 499B of the auto-navigating robotic processing vehicle 500, 600, and/or any other suitable (moving, stationary or fixed) interchangeable carts, tables, and/or racks substantially automatically sets a position of the auto-navigating robotic processing vehicle 500, 600, and/or any other suitable (moving, stationary or fixed) interchangeable carts, tables, and/or racks relative to the device or tool (such as the dock frame 499 and corresponding dock frame module 4150).

The predetermined known spatial relationships between the processing components disposed on the dock frame modules 4150, the coupling unit 450, mobile carts 110A-110F, auto-navigating robotic processing vehicle 500, 600, or any other suitable (moving, stationary or fixed) interchangeable carts, tables, and/or racks with respect to their respective docking interfaces 499A, 499B effects true interchangeability between these components and substantially automatically sets a position of one component relative to another upon coupling of the docking interfaces 499A, 499B. In one aspect, the docking interfaces 499A, 499B include provisions for substantially automatically connecting air, gases, communication and power between the dock frame 499 and other dock frames 499, coupling units 450, mobile carts 110A-110F, auto-navigating robotic processing vehicle 500, 600, or any other suitable (moving, stationary or fixed) interchangeable carts, tables, and/or racks. In one aspect, the signal indicating the position of the mobile carts 110A-110F, auto-navigating robotic processing vehicle 500, 600, or any other suitable (moving, stationary or fixed) interchangeable carts, tables, and/or racks, or coupling unit 450) features described above may be communicated to the dock frame 499 through the coupling of the docking interface 499A, 499B so that a presence of the respective component (and any processing equipment thereon) is communicated to the processing equipment of the dock frame module 4150 (e.g., automatic registration of the cart, etc. and the processing equipment thereon with the dock frame module and the processing component located thereon).

In one aspect, referring to FIG. 4A, the robotic processing system 100, 100A includes any suitable control system 457 for operating the processing equipment within the robotic processing system 100, 100A. In one aspect, the control system 457 is formed by one or more of the dock frame controllers 457D, robot controllers 457R, storage carousel controllers 457S, cart controllers 457C, and any other suitable controller of any suitable processing equipment that forms a part of the robotic processing system 100, 100A. The different controllers of the control system 457 may be ganged controllers having control modules that are communicably coupled to each other through, for example, a controller area network (CAN) bus architecture, which may be suitable for both hard and soft real-time computing requirements in automation equipment and where the connectivity between controllers (at least for the different dock frame modules 4150, mobile carts 110A-110F, auto-navigating robotic processing vehicle 500, 600, or any other suitable (moving, stationary or fixed) interchangeable carts, tables, and/or racks, and coupling unit 450) is provided by the coupling of the docking interfaces 499A, 499B of the respective components. In one aspect, the coupling unit 450 may be a pass through module without a controller where air, gases, communication and power is passed through the coupling unit 450 without being affected by the coupling unit 450.

The robotic processing system 100 may also be provided with a common power supply 458, a common air supply 456, and/or a common gas supply 459. For example, one or more of the common power supply 458, common air supply 456, and common gas supply 459 may be coupled to a dock frame module 4150 of the robotic processing system 100, 100A, such as through a docking interface 499A or other suitable couplings. The power, air, and/or gas may be supplied throughout the spine structure 410 formed by the dock frames 499 (e.g., from docking module 4150 to docking module 4150) through the couplings formed by the docking interfaces 499A. The power, air, and/or gas may also be supplied to the mobile carts 110A-110F, auto-navigating robotic processing vehicle 500, 600, or any other suitable (moving, stationary or fixed) interchangeable carts, tables, and/or racks coupled to the spine structure 410 through couplings formed between the docking interfaces 499A of the dock frame modules 4150 and the respective docking interfaces 499B of the mobile carts 110A-110F, auto-navigating robotic processing vehicle 500, 600, or any other suitable (moving, stationary or fixed) interchangeable carts, tables, and/or racks.

Referring to FIGS. 4A and 4B, the docking interfaces 499A, 499B provide for zero footprint docking (e.g., one component may be abutted substantially directly against another component when docked). In other aspects, the docking interfaces 199A' may be substantially similar to that described in U.S. Pat. No. 8,734,720 titled "AUTOMATED TESTING SYSTEM ARRANGEMENTS USING DOCKING STATION," issued on May 27, 2014, the disclosure of which is incorporated by reference in its entirety. In one aspect, one or more of the docking interfaces 499A, 499B may be extendable (docking interfaces 499A is shown as being extendable in FIG. 4B for exemplary purposes). For example, the docking interface 499A may include a seating surface interface member 499A1 and a component interface member 199A2 that are movable relative to each other in direction 177 (see FIG. 4B) so that the seating surface interface member 499A1 and component interface member 499A2 move towards and away from each other. Any suitable guiding members 499G may be provided so that the movement between the seating surface interface member 499A1 and the component interface member 499A2 is a controlled guided movement so as to maintain a known predetermined spatial relationship between the control features 499CONT disposed on the component interface member 499A2 and the datum surface 499S of the dock frame 499 (and the datum established thereby) so that the repeatable positioning of the robotic processing system 100, 100A components is maintained in the manner described above. In one aspect, the guiding members 499G may be a scissors type guiding member (see FIG. 4B), linear slides, pistons, etc. In one aspect, relative movement between the seating surface interface member 499A1 and the component interface member 499A2 may be biased so that the seating surface interface member 499A1 and the component interface member 499A2 are biased together or biased apart. In other aspects the relative movement between the seating surface interface member 499A1 and the component interface member 499A2 may be manual so as to manually adjust the distance between the seating surface interface member 499A1 and the component interface member 499A2. Providing an extendable docking interface 499A, 499B provides for spacing of one or more of the mobile carts 110A-110F, auto-navigating robotic processing vehicle 500, 600, or any other suitable (moving, stationary or fixed) interchangeable carts, tables, and/or racks at optimal distances to suit a predetermined laboratory process (see, e.g., FIG. 1A where for exemplary purposes only, the mobile cart 110D is configured as a storage cart having laboratory equipment holders and a robot extending therefrom and a position of the laboratory equipment holders and robot is set using the extendable docking interface 499A).

Figure 5:
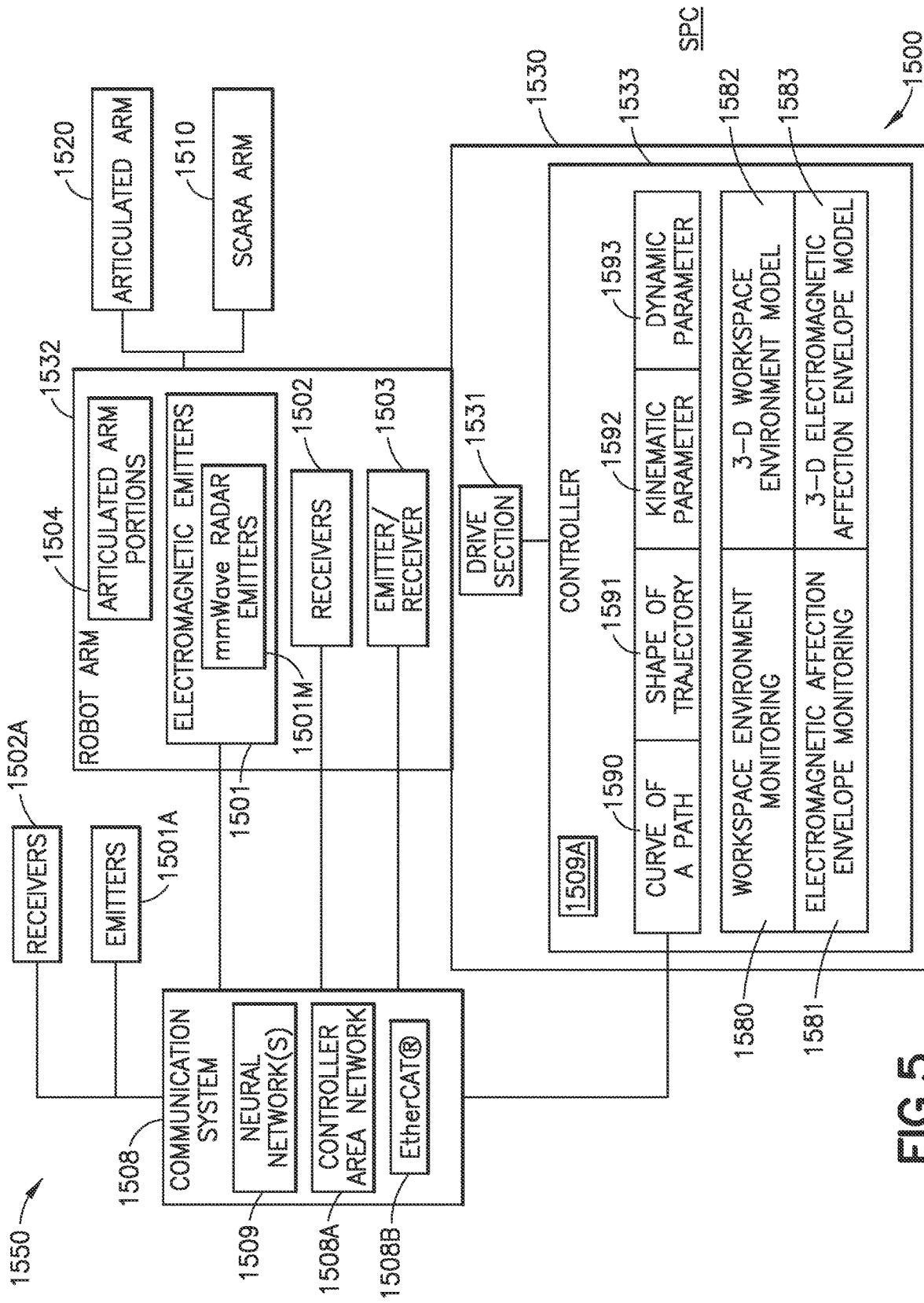
FIG. 5 is a schematic block diagram of a collaborative robot guarding system in accordance with aspects of the present disclosure.
Figure 6B:
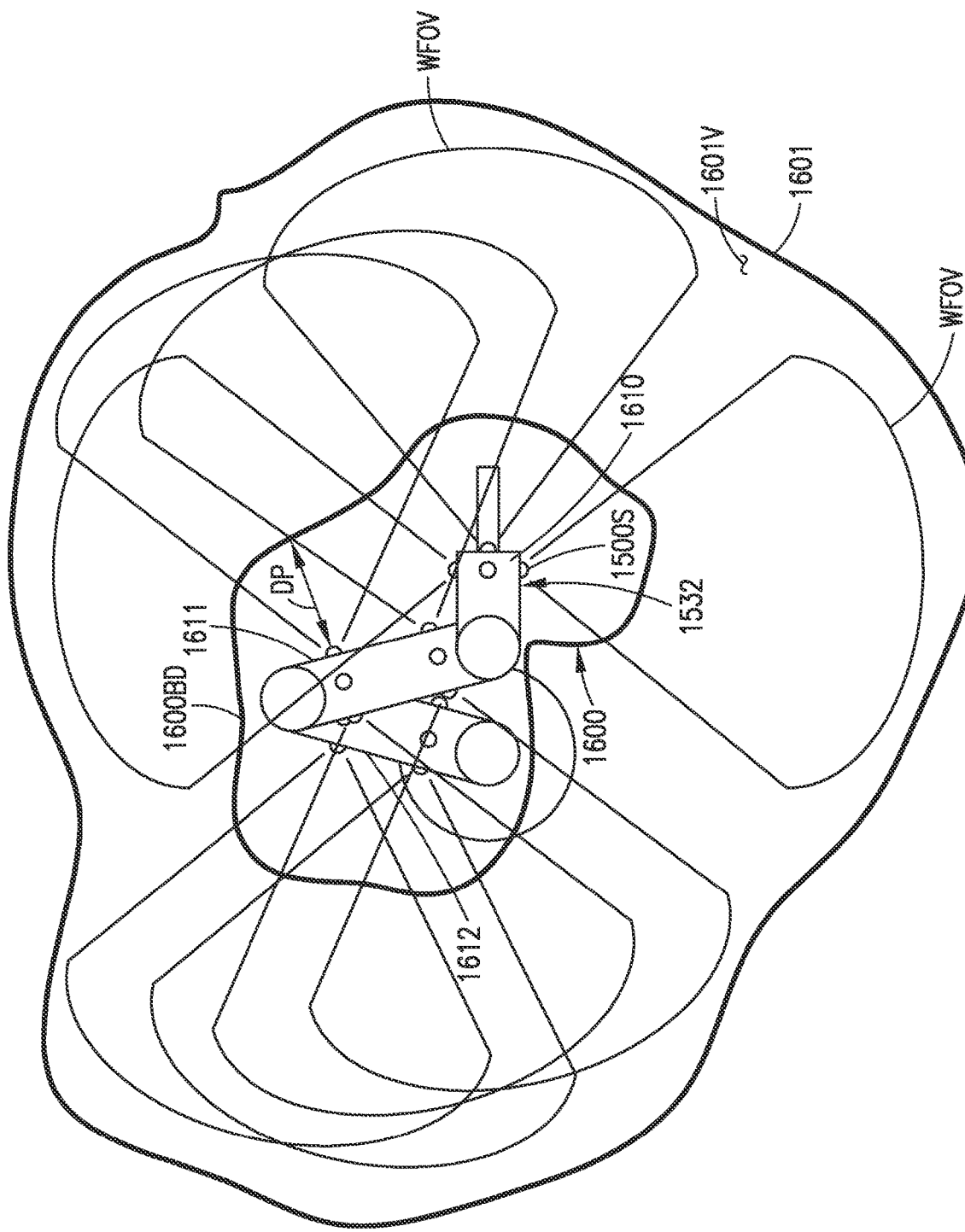

Referring now to FIG. 5, the transport arms 120, 172, 422, 510A, 510A' described herein are generally represented by robotic transport system 1500. As described herein the robotic transport system 1500 may be disposed on fixed (e.g., non-moving) platforms (e.g., such as automated system 170) and/or mobile carts (the mobile carts including automated/motorized carts such as the auto-navigating robotic processing vehicle 500, 600 (FIGS. 2 and 3) and non-motorized mobile carts 110 such as those that are pushed by humans or other automation (FIGS. 3A-3C)). Here the robotic transport system 1500 may be have any suitable robot arm 1532 including, but not limited to, selective compliant articulated robot arms 1510 (SCARA arms an example of which is illustrated in FIGS. 6A and 6B, which has at least a rotational arm motion about shoulder axis SX and a linear arm motion) and articulated arms 1520 (an example of which is illustrated in FIGS. 7A-7D, where each arm link 710-712 has, for example, at least three degrees of freedom indicated by the arrows illustrated in FIG. 7A). The different types of robot arms are generally illustrated in FIG. 5 as robot arm 1532. Generally, the robotic transport system 1500 includes a frame 1530 (which may be a mobile cart frame, a frame of an automated system or any other suitable frame such as those described above), a drive section 1531, and a robot arm 1532. The drive section 1531 is connected to the frame 1530.

The robot arm 1532 is operably coupled to the drive section 1531 so that the drive section 1531 drives motion of the robot arm 1532 to provide the robot arm 1532 with an arm motion in at least one axis of motion (e.g., a linear axis (or axes) of motion and/or a rotational axis (or axes) of motion) moving at least a portion of the robot arm 1532 in the collaborative space SPC, corresponding to the frame 1530. For example, the robot arm 1532 includes articulated arm portions 1504 (e.g., arm links, end effectors, etc.) operably coupled to the drive section providing the articulated arm with the arm motion noted above. In one aspect, such as where the articulated arm 1532 is cart borne, the at least one axis of motion moves at least a portion of the articulated arm portions in the collaborative space (e.g., that corresponds to a selectably variable cart location of the cart-borne articulated arm). In the aspects, of the present disclosure, the motion of the robot arm 1532 is from a first location, in which the robot arm has a first shape (see, e.g., the different shapes 1690, 1695, 790, 795, 796 of the robot arms in FIGS. 6A-7D), to another different location of at least the portion of the robot arm 1532 in the collaborative space SPC, in which the robot arm has another different shape (again see, e.g., the different shapes 1690, 1695, 790, 795, 796 of the robot arms in FIGS. 6A-7D). The shape of at least the portion of the robot arm 1532 at the first location is different than the another different shape of the robot arm 1532 at the other different location.

As noted above, a collaborative robot guarding system 1550 is provided for the detection of obstacles and humans within, for example, the collaborative operating space SPC. In one aspect, the cart to which the robot arm 1532 is mounted defines an integrated electromagnetic sensor system (e.g., collaborative guarding system 1550) that defines multiple selectable and adaptive sensing zones, i.e., an electromagnetic sounding zone 1601 and an electromagnetic affection envelope/zone 1600. As such, the collaborative robot guarding system 1550 provides both a "broad" electromagnetic "sounding" zone/volume (also referred to as a region) 1601 and a bot arm "affection" envelope 1600 that is close coupled to a contour of the robot arm 1532 in motion from a first location to another different location. The electromagnetic sounding zone/volume 1601 is different than the electromagnetic affection envelope 1600 and covers the collaborative space SPC substantially in its entirety. The electromagnetic sounding zone/volume 1601 is separate and distinct from the electromagnetic affection envelope 1600 and encompasses the electromagnetic affection envelope 1600 substantially in its entirety for each different robot arm 1532 shape (whether the robot arm is cart-borne or at a fixed station) and each location of the robot arm 1532 in the collaborative space SPC. The electromagnetic sounding zone/volume 1601 comprehensively includes at least part of, and in some aspects all of, the collaborative space SPC so as to cover a maximum range of available robot arm 1532 motions (which robot arm motions may be a function of a number of degrees of freedom of the robot arm and/or a configuration of the stations which the robot arm interfaces). In one aspect, the electromagnetic sounding zone/volume 1601 is dynamically located (e.g., moves with) and initialized from a selectably variable cart (e.g., such as those carts described herein on which the robot arm 1532 is mounted). As described herein, the electromagnetic sounding zone/volume 1601 maps to a topology of the collaborative space SPC associated with the location of the robot arm 1532 and/or the available motions of the robot arm 1532. Mapping the topology (e.g., equipment/object locations, types of equipment, equipment/object features/surfaces, etc.) of the collaborative space may be performed with the cart to which the robot arm 1532 is mounted moves (either automatically or manually) through the collaborative space SPC.

In one aspect, the electromagnetic sounding zone/volume 1601 is defined by at least one of the electromagnetic emitters 1501 borne by the cart-borne robot arm 1532. In one aspect, the electromagnetic sounding zone/volume 1601 is defined by at least another electromagnetic emitter 1501A different than the electromagnetic emitters 1501 borne by the cart-borne robot arm 1532. In one aspect, the different electromagnetic emitter 1501A is mounted on a cart 110 (FIGS. 3B, 3C—see also vehicles 500, 600) bearing the cart-borne robot arm 1532. As may be realized, the different electromagnetic emitter 1501A may be mounted on the fixed station (see automated station 170) that bears the robot arm 1532. As may also be realized, the receivers 1502A may be disposed on the cart that bears the robot arm, the fixed station, or at any other suitable location of the collaborative space SPC for receiving reflected emissions from the emitters.

The electromagnetic sounding effects mapping a topology of the variably configurable collaborative space SPC that is dynamically based, at least in part, on a variably selectable cart location. The electromagnetic sounding forms a zone/volume (e.g., electromagnetic sounding zone/volume 1601) that is explored with electromagnetic waves that are reflected from objects (humans, laboratory equipment, carts, etc.) within the collaborative space SPC (see. e.g., FIGS. 1A, 1C, and 6B) so as to detect the topology/surface of objects in the electromagnetic sounding zone/volume 1601. The electromagnetic sounding zone/volume 1601 is generated by the electromagnetic emitters 1501 (or emitter of emitter/receiver 1503) that are borne by the cart-borne robot arm 1532 and configured to cover a predetermined volume of the collaborative space SPC so that a collaborative object in the predetermined volume is detected with an electromagnetic sensor (e.g., receivers 1502, 1502A or receiver in emitter/receiver 1503) cooperative with the electromagnetic emitters 1501 (or emitter in emitter/receiver 1503). For example, the electromagnetic emitters 1501 are a multitude of millimeter wave radar sensors/emitters 1501M distributed on at least the portion of the robot arm 1532 (e.g., mounted to articulated sections of the robot arm) and oriented so as to radar sound the collaborative space SPC in each direction, away from the robot arm 1532, substantially aligned with each direction component of motion of each of at least the portion of the robot arm 1532 moving from the first location to the other different location.

The bot arm affection envelope effects arm motion characteristics (as described herein) of the cart-borne robot arm 1532 with respect to interaction with objects within the affection envelope 1600. The electromagnetic affection envelope 1600 is generated by the electromagnetic emitters 1501 (or emitters of emitter/receive 1503) so that the electromagnetic affection envelope 1600 is defined by robot arm 1532 and is close coupled and substantially conformal to at least a dynamic contour part of each different arm shape of the robot arm 1532 with one or more of at least the portion of the robot arm 1532 moving from the first location to the other different location, and the robot arm 1532 changing shape from the first shape to the other different shape. In one or more aspects, the electromagnetic affection envelope 1600 is generated by a network of electromagnetic sounding waves (see, e.g., FIGS. 6A-7D) from the electromagnetic emitters 1501 (or emitters of emitter/receive 1503) so that contours, of the electromagnetic affection envelope 1600, set at a predetermined range limit from the robot arm 1532 are defined dynamically by the robot arm 1532 and substantially correspond to each different arm shape of the robot arm 1532 with one or more of at least the portion of the robot arm 1532 moving from the first location to the other different location, and the robot arm 1532 changing shape from the first shape to the other different shape.

In another aspect, such as where the robot arm 1532 is mounted to a fixed station (such as in FIGS. 1A and 1B), the fixed station defines an integrated electromagnetic sensor system (e.g., collaborative guarding system 1550) that provides both "broad" electromagnetic "sounding" and a bot arm "affection" envelope that is close coupled to a contour of the robot arm 1532 in motion from a first location to another different location in a manner similar to that described above; however, electromagnetic sounding effects mapping a topology of the variably configurable collaborative space that is dynamically based on a variably selectable number of carts that may be coupled to the fixed station. Here, the cart and/or fixed station defines the integrated electromagnetic sensor system via the robot arm 1532 that is interchangeably selected for coupling with the cart so as to configure the cart with different degrees of freedom of motion for different robot arm motions, trajectories, and/or functions.

As noted above, the collaborative guarding system 1550 includes electromagnetic emitters 1501, receivers 1502, 1502A, and/or integrated sensors 1503 (e.g., having both emitters/receivers) that are configured to generate at least the electromagnetic affection envelope 1600 (FIGS. 6A-6C and 7A-7D), where the electromagnetic affection envelope 1600 may be a subset of a workspace environment WE in which the robot arm 1532 operates. In one aspect, at least the electromagnetic emitters 1501 are borne by (e.g., mounted to and carried by) the robot arm 1532. In one aspect, the receivers 1502A are disposed within the collaborative space SPC at predetermined locations off-board the robot arm 1532 (e.g., such as on collaborative objects including but not limited to as humans, other robot arms, carts, etc. for receiving radiation from the electromagnetic emitters and effecting detection of the collaborative objects; or at fixed locations such as walls or cabinets of the collaborative space where intervention of collaborative objects between the electromagnetic emitters and the receivers effects detection of the collaborative objects); while in other aspects, both the electromagnetic emitters 1501 and the receivers 1502 (and/or integrated sensors 1503) are borne by the robot arm 1532. At least the electromagnetic emitters 1501 being borne by the robot arm 1532 effect an electromagnetic affection envelope 1600 that is defined by the robot arm 1532 and that is close coupled (e.g., moves with and changes shape with the robot arm 1532) and is substantially conformal to at least part of a dynamic contour of each different arm shape of the robot arm 1532 with one or more of at least the portion of the robot arm 1532 (or articulated arm portions 1504 of the robot arm 1532) moving from the first location to the other different location, and the articulated arm changing shape from the first shape to the other different shape. In one or more aspects, the receivers 1502, 1502A are disposed in the collaborative space so as to receive reflected emissions and sense therefrom the collaborative object in the electromagnetic affection envelope.

Referring to FIG. 5 and briefly to FIGS. 6A-6C and 7A-7D, the electromagnetic emitters 1501, receivers 1502, 1502A, and/or integrated sensors 1503 may be configured as millimeter wave radar components (e.g., emitters, receivers, and/or sensors) mounted to articulated sections of the robot arm 1532. The electromagnetic affection envelope 1600 is defined by a network of millimeter wave radar beams (which are represented by the fields of view FOV shown in FIGS. 6A-6C and 7A-7D) generated by the electromagnetic emitters 1501 (and/or emitter/receiver 1503 as well as emitters 1501A and receivers 1502A) that are disposed on more than one articulated sections 1610-1612 (FIG. 6A), 710-712 (FIG. 7A) of the robot arm 1532 (it is noted that the emitters 1501, sensors 1503, etc. are generally denoted as sensor 1500S in FIGS. 6A-7D for illustrative purposes). In one aspect, each articulated section 1610-1612, 710-712 of the robot arm 1532 with different kinematic motion has more than one millimeter wave radar emitter/sensor forming at least part of a multitude of sensors forming the network of millimeter wave radar beams.

At least two adjacent electromagnetic emitters 1501 (and in some aspects the receivers 1502 and in other aspects the integrated sensors 1503) have overlapping emitter/receiver/sensor fields of view FOV; while in other aspects each field of view FOV of each emitter/receiver/sensor overlaps a field of view FOV of an adjacent emitter/receiver/sensor. The overlapping fields of view FOV provide for substantially complete sensor coverage of substantially an entire workspace environment WE (FIGS. 1A and 1C) of the collaborative space SPC; however, in some aspects there may be areas of the workspace environment WE that do not need to be monitored by the collaborative robot guarding system 1550 such that emitters/receivers/sensors may not be provided on certain portions of the robot arm 1532 (e.g., such as where the robot arm 1532 operates adjacent a wall, adjacent zones where human access is restricted, or adjacent portions of the workspace environment 1532 that have fixed configurations without human presence. The multitude of (i.e., a grouping or arrangement of regularly spaced) emitters/receivers/sensors may are placed on the robot arm 1532 with overlapping field of view FOV coverage to obtain desired sensor coverage while omitting coverage in undesired areas of the workspace environment 1532.

Referring again to FIG. 5, the collaborative guarding system 1550 also includes any suitable communication system 1508 that couples the electromagnetic emitters 1501, receivers 1502, 1502A, and/or integrated sensors 1503 to, for example, a controller 1533 of the robotic transport system 1500 or any other suitable controller that is in communication with the controller 1533 to effect movement of the robot arm 1532. The communication system 1508 may be a controller area network 1508A, an EtherCAT® network or any other suitable communications network for transmitting data between the electromagnetic emitters 1501, receivers 1502, 1502A, and/or integrated sensors 1503 and the controller 1533. It is noted that the EtherCAT® network requirements have been standardized in International Electrotechnical Commission (IEC) standards 61158 and 61784 as well as Semiconductor Equipment and Materials International (SEMI™) standard E54.20 and may be suitable for both hard and soft real-time computing requirements in automation equipment. The communication system 1508 may also include any suitable number of neural networks 1509 coupled to the electromagnetic emitters 1501, receivers 1502, 1502A, and/or integrated sensors 1503. While the neural network(s) 1509 is illustrated and described as being part of the communication system 1508, in other aspects the neural networks(s) 1509 may be resident within the controller 1533 (where reference to the controller 1533 herein refers to any suitable processor(s) and memory for processing and storing any suitable data generated by the electromagnetic emitters 1501, receivers 1502, 1502A, and/or integrated sensors 1503 and for operating the robot arm 1532) so that output data from the electromagnetic emitters 1501, receivers 1502, 1502A, and/or integrated sensors 1503 is processed by the controller implementing the neural network 1509.

In one aspect, each of the electromagnetic emitters 1501, receivers 1502, 1502A, and/or integrated sensors 1503 has a respective neural network. Each respective neural network is trained in any suitable manner to detect the different types of obstacles (e.g., humans, mobile carts 110, auto-navigating robotic processing vehicles 500, 600, other robot arms, etc.), that may be encountered within the workspace environment WE and the collaborative operating space SPC that forms at least a portion of the workspace environment WE. The data received by the controller 1533 from the electromagnetic emitters 1501, receivers 1502, 1502A, and/or integrated sensors 1503 (which in one aspect has been processed by the respective neural networks) may be employed by the controller 1533 for the operation of the robot arm 1532. In one aspect, output data from the receivers 1502, 1502A is processed by the controller 1533 implementing a suitable neural network 1509A (see FIG. 5) which may be employed in conjunction with or in lieu of neural network 1509.

The controller 1533 is communicably connected to the electromagnetic emitters 1501, receivers 1502, 1502A, and/or integrated sensors 1503 (e.g., each one of which may be referred to as a millimeter wave radar sensor) so as to selectably activate the electromagnetic emitters 1501, receivers 1502, 1502A, and/or integrated sensors 1503 and select a radar emission direction (e.g., one or more directions corresponding to the left, the right, the top, and/or the bottom of a link of the robot arm 1532) from a number of independently selectable radar emission directions defined (via a position/location on the robot arm 1532) by the electromagnetic emitters 1501, receivers 1502, 1502A, and/or integrated sensors 1503 based on at least one direction component of motion of at least the portion of the robot arm 1532 moving. The controller 1533 is configured so that in response to detection, from radar emission by selected ones of the electromagnetic emitters 1501, receivers 1502, 1502A, and/or integrated sensors 1503, of approach of an object, in the collaborative space relative to at least the portion of the robot arm 1532 moving, command the drive section 1531 affecting a predetermined kinematic or dynamic characteristic of motion of at least the portion of the robot arm 1532 moving. In one aspect, the selected radar emission direction sounds a dynamically selected limited region of the collaborative space (see the various fields of view FOV in FIGS. 6A-7D and electromagnetic affection envelope 1600) limited so as to be defined by directions substantially aligned with each of the at least one direction component of motion of the robot arm 1532 or a portion thereof (e.g., such as arm links and end effectors). The selected limited region of the collaborative space SPC (e.g., defined by one or more fields of view of selected sensors) corresponds substantially in entirety to each of the at least one direction component of motion, so that each of the portions of the robot arm 1532 moving, through each arm position, from the first location to the other different location (see FIGS. 6A-7D) traverses through the selected limited region of the collaborative space SPC substantially in entirety.

Referring to FIGS. 5, 1A, 1C, 6A and 6B, in one aspect, the controller 1533 is communicably connected to the receivers 1502, 1502A and/or emitter/receiver 1503 (e.g., sensors) to detect presence of the collaborative object (e.g., such as human 199, vehicle 500, etc.—see FIG. 1C) in the predetermined volume defined 1601V (i.e., of the electromagnetic sounding zone/volume 1601). The controller 1533 is communicably connected with the electromagnetic emitters 1501 and/or emitter/receiver 1503 and configured so as to dynamically form the electromagnetic affection envelope 1600 based on detection of the collaborative object presence in the predetermined volume 1601V. The controller 1533 is configured to dynamically form bounds (e.g., see boundary 1600BD in FIG. 6B) of the electromagnetic affection envelope 1600 based on detection of the collaborative object presence within the predetermined volume 1601V. In one aspect, the controller 1533 dynamically changes the form (e.g., shape, size, etc.) of the bounds 1600BD of the electromagnetic affection envelope 1600 based on detection of the collaborative object presence. As an example, A depth DP of the electromagnetic affection envelope 1600 may be increased upon detection of an object (either by detection with the electromagnetic affection envelope 1600 or by detection with the electromagnetic sounding zone/volume 1601) so as to provide a suitably sized object detection zone for anticipating and tracking movements of the object. In addition, referring to FIG. 6C as an example, the robot arm 1532 may be rotating in direction 1699 where the millimeter wave radar sensors located on side 1532S1 of the robot arm 1532 are activated (e.g., the millimeter wave radar sensors located on side 1532S2 of the robot arm 1532 may be deactivated and the electromagnetic affection envelope 1600 extends only from side 1532S1) for detecting objects in the direction of motion 1699. The controller 1533 may determine an object has entered the electromagnetic sounding zone/volume 1601 behind the robot arm (e.g., relative to the direction of movement 1699) and activate the millimeter wave radar sensors located on side 1532S2 to track movement of the object relative to the robot arm 1532 so that the electromagnetic affection envelope 1600 extends from both sides 1532S1, 1532S2 of the robot arm 1532.

In one aspect, the controller 1533 is communicably connected to the sensor(s) (e.g., emitters and/or receivers) that is/are operative with the electromagnetic sounding zone 1601 and the controller 1533 is configured to register a change in the presence of the collaborative object in the predetermined volume 1601V of the electromagnetic sounding zone/volume 1601, and in response to the registered change dynamically alter the form of the electromagnetic affection envelope 1600. For example, a registered change in the presence of a collaborative object in the electromagnetic sounding zone, such as when a new collaborative object is detected or a collaborative object moves closer to the robot arm 1532, may result in an increase in size of the electromagnetic affection envelope 1600; whereas, the electromagnetic affection envelope 1600 may decrease in size when the collaborative object is registered as moving away from the robot arm 1532 or leaving the electromagnetic sounding zone/volume 1601. In other aspect, the form of the electromagnetic affection envelope may change in any suitable manner upon the controller 15333 registering a change in the presence of a collaborative object. For example, the direction in which electromagnetic affection envelope 1600 extends may change (e.g., relative to the top, bottom and sides of the arm links and end effector) depending on detection of an object in the electromagnetic sounding zone/volume 1601 in a manner similar to that described above.

In one aspect, the controller 1533 is configured to change the form of the electromagnetic affection envelope 1600 based on a direction defined by the registered change in presence of the collaborative object within the predetermined volume 1601V as related to a direction of motion or planned direction of motion of the at least the portion of the articulated arm portions moving. For example, if the moving portions of the robot arm 1532 are moving towards the collaborative object (whose presence within the predetermined volume 1601V has changed) the electromagnetic affection envelope 1600 may increase in size/depth in the direction of arm movement towards the collaborative object to, for example, provide for detection of collaborative object entry within the electromagnetic affection envelope 1600 with sufficient time for the controller 1533 to change an arm movement characteristic in response to the detection of entry of the collaborative object within the electromagnetic affection envelope 1600. As another example, where the collaborative object is registered as moving from a front side of the robot arm 1532 to a back side of the robot arm 1532, the electromagnetic affection envelope on the back side of the robot arm 1532 may be increased in size so as to detect the collaborative object for effecting trajectory planning of the robot arm 1532 in view of the registered change in presence of the collaborative object. In other aspects, the controller may increase the number of times the controller switches (i.e., frequency of switching increases) between workspace environment monitoring 1580 and electromagnetic affection envelope monitoring 1581 so as to track the changes in movement of the collaborative object based on the registered change in presence of the collaborative object and adjust the form of the electromagnetic affection envelope 1600 accordingly.

In one aspect, the emitters 1501, 1501A and receivers 1502, 1502A (and/or emitter/receiver 1503) are common to and operative with both the electromagnetic sounding zone/volume 1601 and the electromagnetic affection envelope 1600 and the controller 1533 is configured to selectably switch between generation of the electromagnetic sounding zone/volume 1601 and generation of the electromagnetic affection envelope 1600 so as to effect the changes in form of the electromagnetic affection envelope 1600. In other aspects, sensors associated with the electromagnetic sounding zone/volume 1601 may be different from the sensors associated with the electromagnetic affection envelope 1600. For example, the sensors associated with the electromagnetic sounding zone/volume 1601 may be infrared sensors, optical sensors or other suitable sensors that are different from the radar sensors of the electromagnetic affection envelope 1600, where the sensors of the electromagnetic sounding zone/volume 1601 may be located on the robot arm 1532 or the cart/station on which the robot arm 1532 is mounted.

As an example of changing the form of the electromagnetic affection envelope 1600 and switching between the electromagnetic affection envelope 1600 and the electromagnetic sounding zone/volume 1601, the controller 1533 is configured to control an output strength of the radar beams of the electromagnetic emitters 1501 and/or integrated sensors 1503 for increasing and/or decreasing the field of view FOV of one or more of the electromagnetic emitters 1501 and/or integrated sensors 1503. For example, the electromagnetic emitters 1501 and/or integrated sensors 1503 may include any suitable components (e.g., gain amplifiers, etc.) that are adjustable so as to increase or decrease the field of view FOV of the respective electromagnetic emitters 1501 and/or integrated sensors 1503. Increasing or decreasing the fields of view FOV provides for one or more of both workspace environment monitoring 1580 and electromagnetic affection envelope monitoring 1581. Workspace environment monitoring 1580 may provide the controller 1533 with an overall calibration of the workspace environment while the electromagnetic affection envelope monitoring 1581 may provide for adjusting one or more predetermined characteristics of at least a portion of the robot arm 1532 as described herein.

For example, the controller 1533 may be configured to control the output strength of the radar beams so as to increase the field of view of the one or more of the electromagnetic emitters 1501 and/or integrated sensors 1503 from a localized field of view FOV (FIG. 6A), that effects electromagnetic affection envelope monitoring 1581, to a workspace field of view WFOV (FIG. 6B), that may extend to boundaries (e.g., so as to encompass processing equipment within the workspace environment WE that the robot arm 1532 may encounter) of the workspace environment and effect workspace environment monitoring 1580 (e.g., via electromagnetic "sounding" zone/volume 1601). In aspects of the present disclosure where the robot arm 1532 is mounted to a mobile cart (either driven by automation such as with auto-navigating robotic processing vehicles 500, 600 or pushed by a human) the mobile cart may be moved around the workspace environment WE so that the workspace field of view WFOV travels through substantially the entire (or any desired portions thereof) of the workspace environment WE (e.g., the workspace field of view dynamically changes).

In one aspect, referring to also to FIG. 6B, the controller 1533 is programmed so that a depth DP of the electromagnetic affection envelope 1600 between a set outermost detection boundary 1600BD of the electromagnetic affection envelope 1600 and the robot arm 1532 is selectably variable dependent on a predetermined characteristic of at least the portion (e.g., link, end effector, etc.) of the robot arm 1532 in motion. In another aspect, the controller 1533 is programmed so that the depth DP of the electromagnetic affection envelope 1600 between the set outermost detection boundary 1600BD of the electromagnetic affection envelope 1600 and the robot arm 1532 is dynamically variable dependent on the predetermined characteristic of at least the portion of the robot arm 1532 in motion. The at least one predetermined characteristic of the arm motion is, in one aspect, at least one of a curve of a path 1590, a shape of a trajectory 1592, a kinematic parameter 1593, and a dynamic parameter 1594 of at least the portion of the articulated arm in motion from the first location to the other different location (see FIG. 5). As a non-limiting example, the depth DP of the electromagnetic affection envelope 1600 may be increased as a speed of movement of the arm increases and the depth DP may be made smaller as the speed of movement of the arm decreases (or vice versa). As another non-limiting example, the depth DP of the electromagnetic affection envelope 1600 may be increased as a curve of a path increases in radius and the depth DP decreased as the curve of the path decreases (or vice versa).

The controller 1533 is communicably connected to the drive section 1531 and is configured so that in response to detection of entry of a collaborative object the controller 1533 commands a change in at least one of the predetermined characteristics of the arm motion. The detection of entry of the collaborative object is due at least in part to motion of at least the portion of the robot arm 1532, where such motion causes the collaborative object to pass into the electromagnetic affection envelope 1600 the contour of which depends on the robot arm 1532 movement. In one aspect, the change in the at least one predetermined characteristic of the arm motion is selected to avoid or prevent contact between the articulated arm and the collaborative object. For example, the controller 1533 may slow or stop movement of the robot arm 1532 in response to the detection of the collaborative object. The controller 1533 may change trajectory of the robot arm 1532 in response to the detection of the collaborative object to a direction that is away from the detected collaborative object. The controller 1533 may change a torque of the drive section 1531 in response to the detection of the collaborative object. In other aspects, any suitable characteristic of arm motion may be changed by the controller 1533 in response to the detection of the collaborative object.

Figure 9:
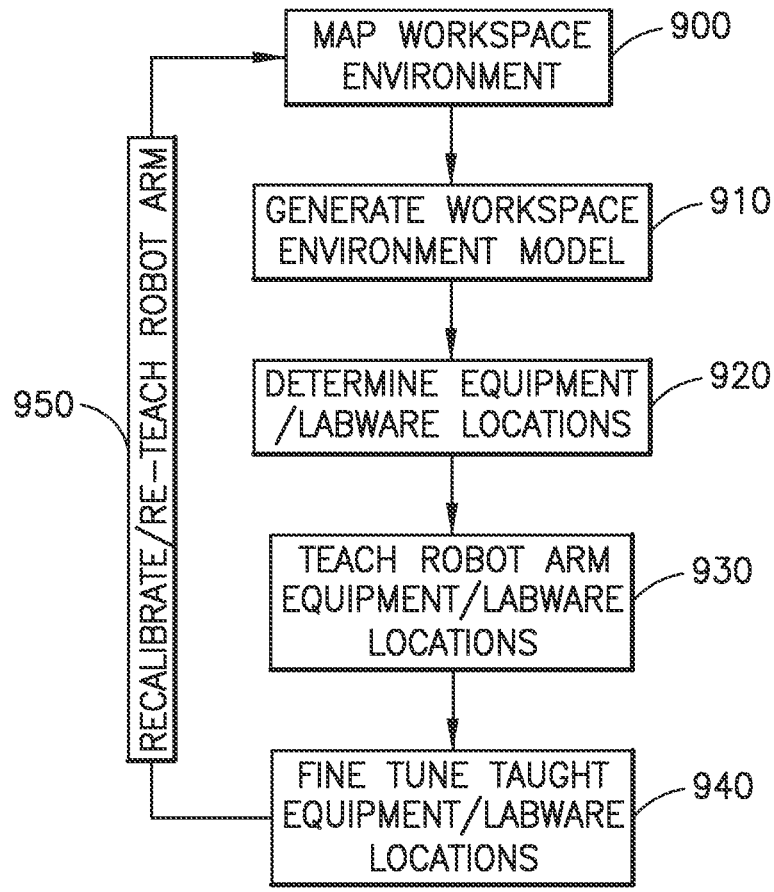
FIG. 9 is a flow diagram of a method in accordance with aspects of the present disclosure.

The controller 1533, employing workspace environment monitoring 1580 through the electromagnetic sounding zone/volume 1601, is configured to map/calibrate the workspace environment WE and to globally calibrate the robot arm 1532 based on workspace environment data obtained by the electromagnetic emitters 1501 and/or integrated sensors 1503, e.g., operating with the workspace field of view WFOV. For example, the global calibration may extend beyond bounds of the electromagnetic affection envelope 1600 so that as the robot arm 1532 is moved from one location (see, e.g., location A in FIG. 1C) within the workspace environment WE to another different location (see, e.g., location B in FIG. 1C) within the workspace environment WE the controller 1533 may automatically recalibrate the robot arm 1532 with respect to the different location within the workspace environment WE. The automatic recalibration of the robot arm 1532 based on the global calibration of the workspace environment WE may provide for the controller 1533 automatically changing the manner in which the robot arm operates so as to interface with different collaborative equipment, automatically changing operating ranges in which the robot arm 1532 moves, etc. so that the robot arm 1532 integrates (e.g., once global calibration of the workspace environment is performed) into any desired location of the workspace environment WE without further teaching/setup of the robot arm 1532. As an example, the controller 1533 is configured map the workspace environment and generated a three-dimensional workspace model (FIG. 9, Block 900). In one aspect, the controller 1533 maps the workspace environment WE via the electromagnetic sounding zone/volume 1601 as the vehicle 500, 600 travels (such as where the robot arm 1532 is cart-borne) through the workspace environment WE. In other aspect, the controller maps the workspace environment WE via the electromagnetic sounding zone/volume 1601 as carts 110A-110F are coupled to the automated system 170 (such as where the robot arm 1532 is fixed and is not cart-borne). Mapping the workspace environment WE provides for the identification of each piece of lab equipment and the sample/labware holding locations (or any other suitable pick/place location and items disposed thereat). In one aspect, the controller 1533 is configured to generate a three dimensional workspace environmental model 1582 (FIG. 9, Block 910) using the data obtained from mapping the workspace environment WE. The three dimensional workspace environmental model 1582 may be parsed by the controller 1533 so that each piece of equipment in the three dimensional workspace environmental model 1582 may be compared with, for example, predetermined computer aided drawing (CAD) models of the respective equipment to identify datum reference locations (e.g., such as datums DF) of the lab equipment so that the controller may determine, based on the datum reference locations and predetermined dimensions of the lab equipment provided by the CAD model, locations for each piece of lab equipment and the sample/labware holding locations (or any other suitable pick/place location and items disposed thereat) (FIG. 9, Block 920). The controller 1533 is configured to use the locations of the lab equipment, etc. in conjunction with predetermined kinematic/dimensional characteristics of the robot arm 1532 to automatically teach the robot arm 1532 where the sample/labware holding locations are (FIG. 9, Block 930). The pick/place locations of the sample/labware at the holding locations may be fine-tuned (e.g., adjusted) based on electromagnetic affection envelope monitoring 1581 (FIG. 9, Block 940).

Workspace environment monitoring 1580, via the electromagnetic sounding zone/volume 1601, by the controller 1533 also provides for automatic recalibration/teaching of the robot arm 1532 (FIG. 9, Block 950) such as where the robot arm is mounted to (e.g., a stationary) automated system 170 (FIG. 1A) and different carts are attached to the automated system 170. In one aspect, the workspace environment monitoring 1581 effects the creation, by the controller 1533, of a three-dimensional (3-D) workspace environment model 1582 and/or a three-dimensional electromagnetic affection envelope model 1583. The workspace environment model 1582 and/or electromagnetic affection envelope model 1583 may be employed by the controller 1533 along with known characteristics of the laboratory environment (e.g., known positional relationships between items/equipment locations on carts 110, known spatial relationships different docked carts or laboratory stations, etc.) to effect the automatic calibration/teaching as described above with respect to one or more of the cart-borne robot arms and fixed station-borne robot arms.

Figure 7A:
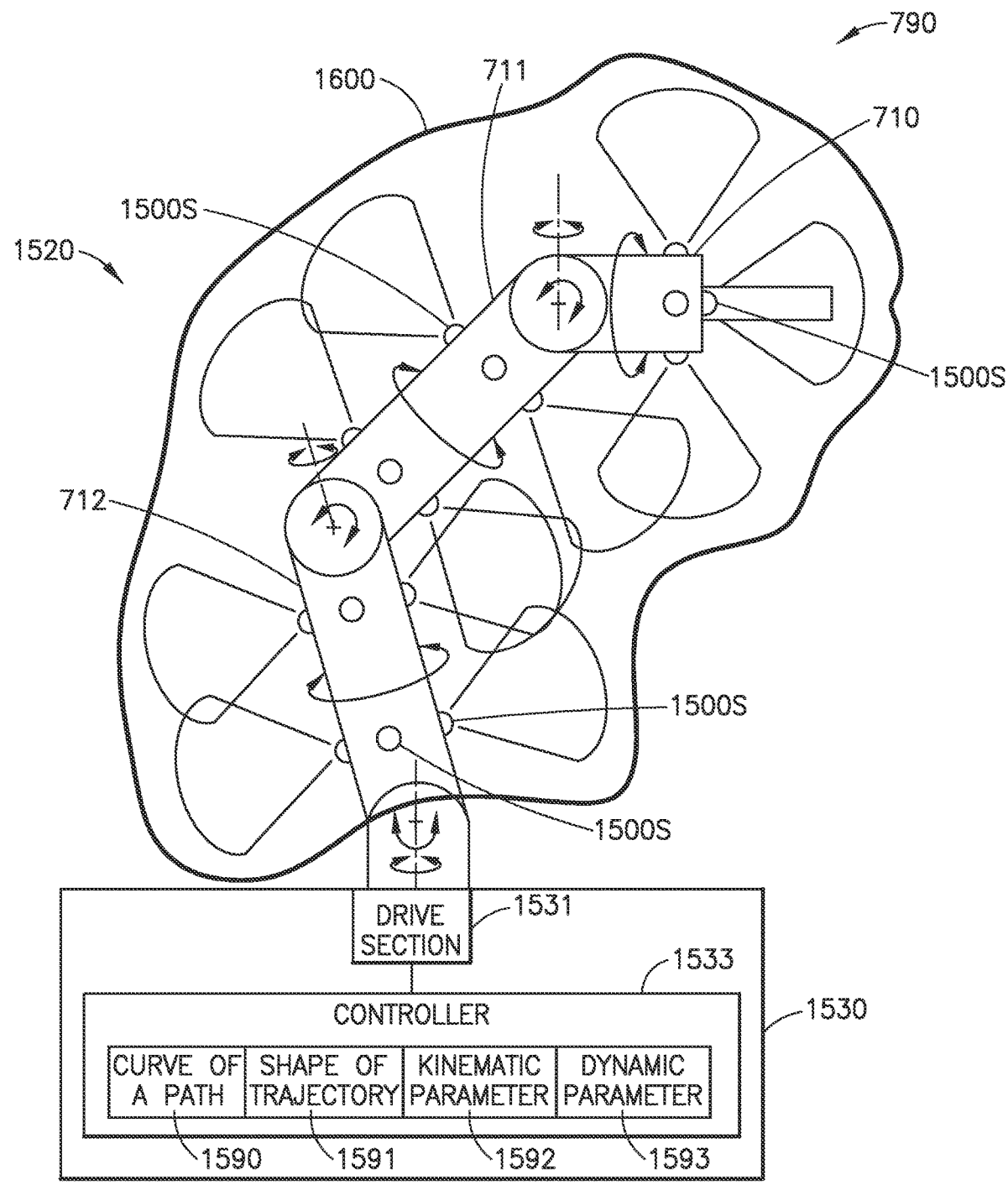
FIGS. 7A-7D are schematic illustrations of a movement sequence of a robot arm incorporating collaborative robot guarding system in accordance with aspects of the present disclosure.
Figure 7B:
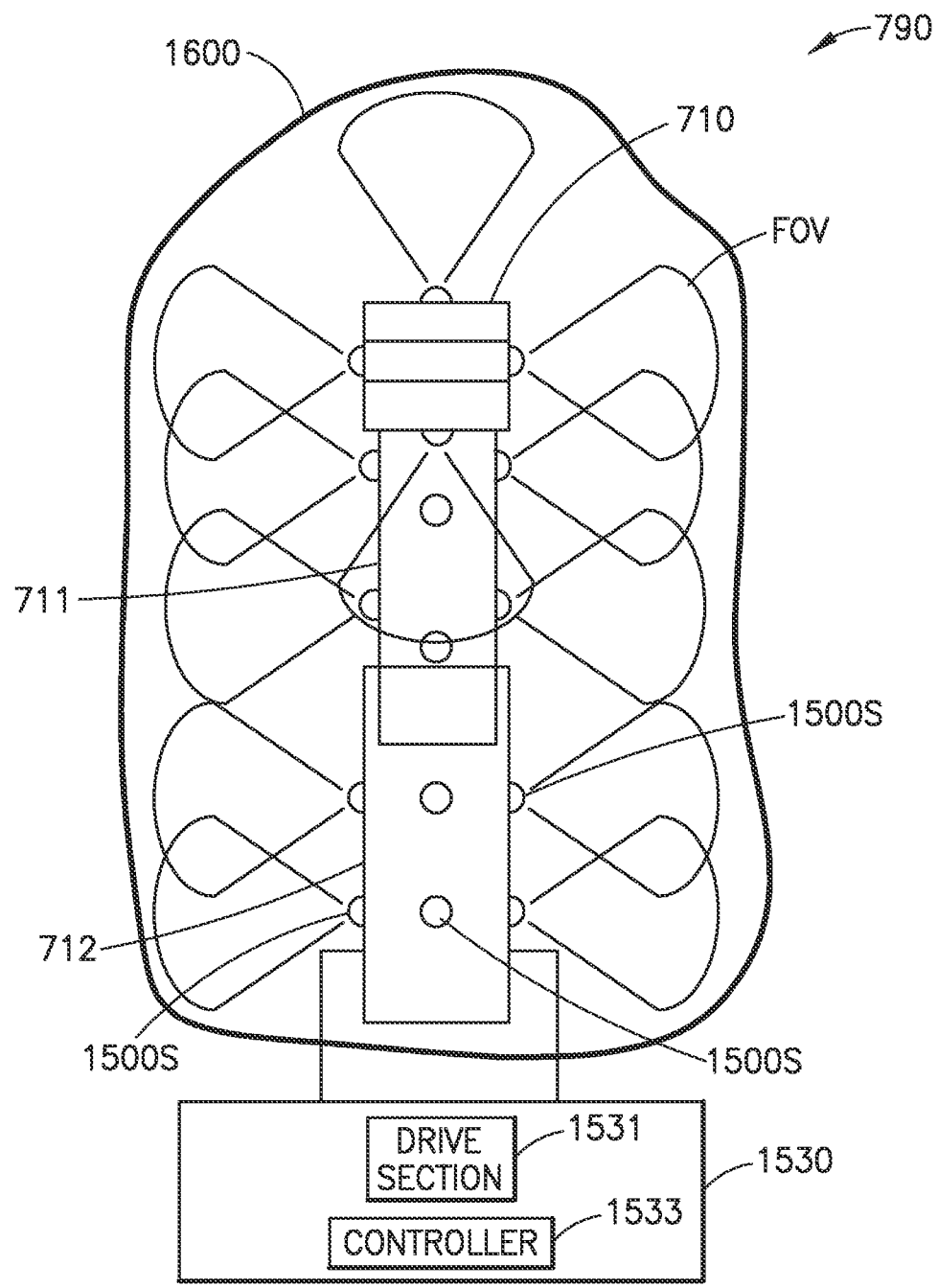
Figure 7C:
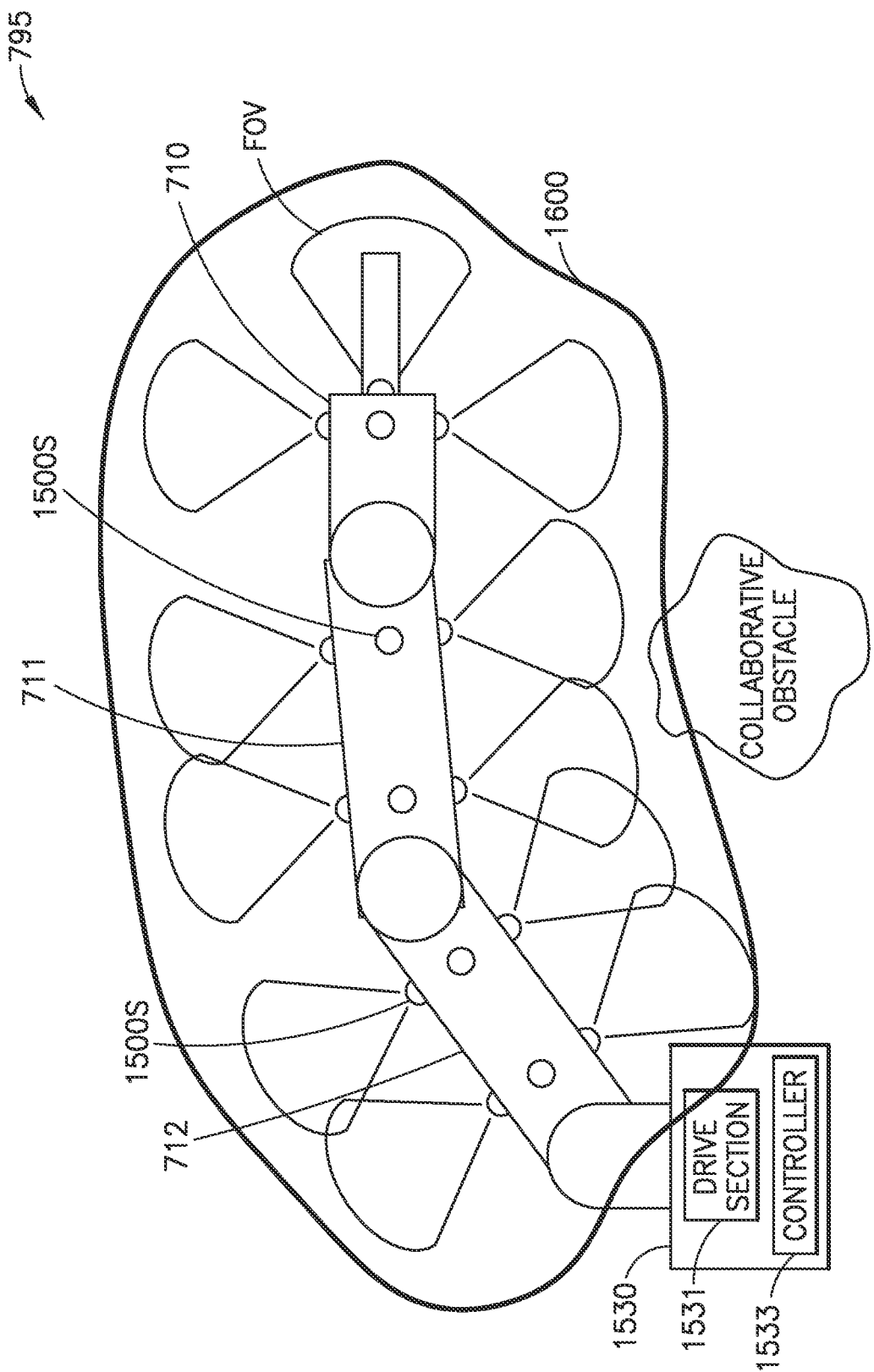
Figure 7D:
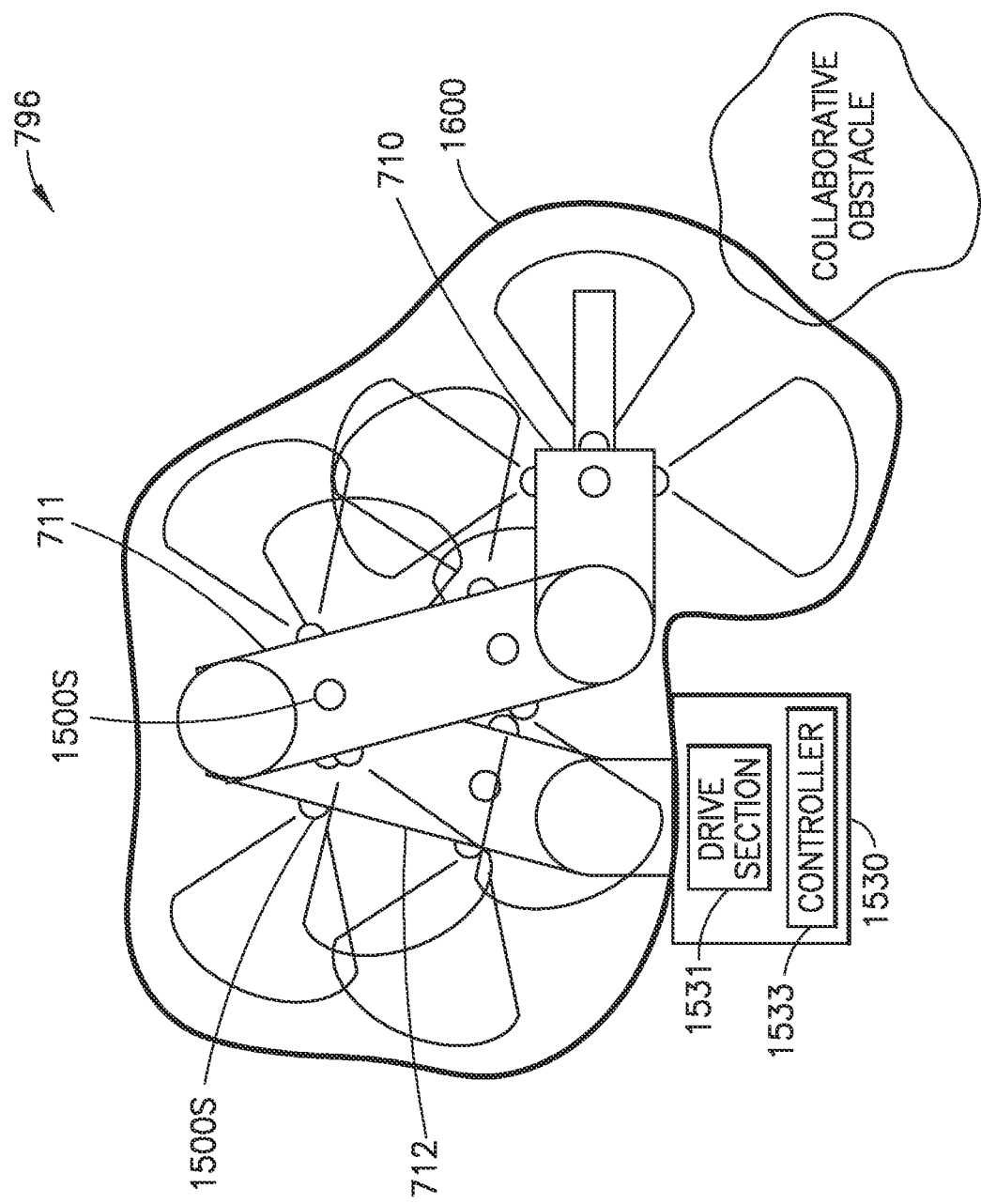
Figure 10:
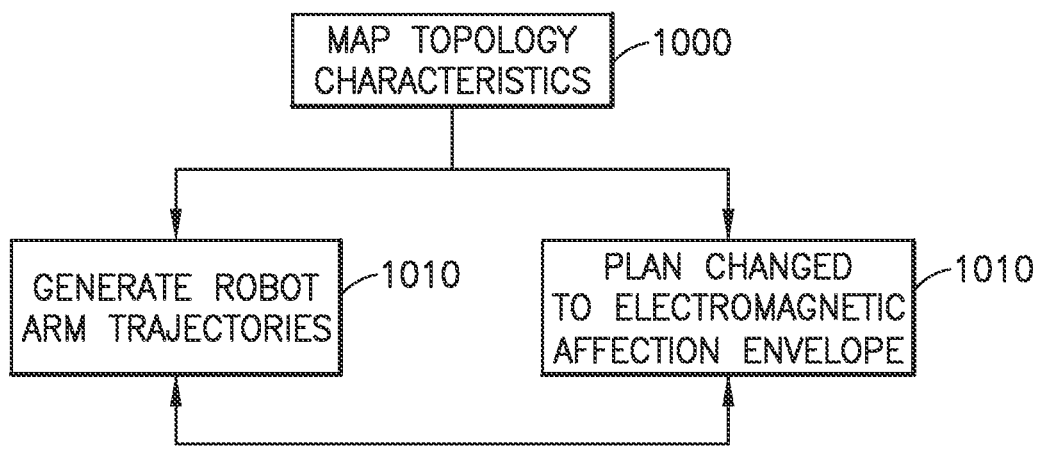
FIG. 10 is a flow diagram of a method in accordance with aspects of the present disclosure.

In one aspect, the controller 1533 is configured to selectably generate the electromagnetic sounding zone 1601 so as to map topology characteristics (as described herein) (FIG. 10, Block 1000) of the predetermined volume 1601V associated with planning a move of the robot arm 1532 moving at least the portion of the articulated arm portions to or from at least one of the first location and the other different location (e.g., see the arm move sequence illustrated in FIGS. 6A-6C, the arm move sequence illustrated in FIGS. 7A and 7B, and the arm move sequence illustrated in FIGS. 7C and 7D). Based on the mapped topology characteristics of the predetermined volume 1601V, the controller 1533 generates trajectories of the robot arm 1532 (FIG. 10, Block 1010) from the first location and the other different location within the predetermined volume 1601V. Mapping data of the topology characteristics of the predetermined volume 1601V obtained by the controller defines a basis for trajectory planning of at least the portion of the robot arm portions (e.g., links, end effectors, etc.) moving. As may be realized, the workspace environment model 1582 and/or electromagnetic affection envelope model 1583 reflect/embody the topology characteristics of the predetermined volume 1601V and may be employed by the controller 1533 in any suitable manner to effect trajectory planning of at least the portion of the robot arm portion moving in the collaborative workspace SPC. For example, the robot arm 1532 movements may be calibrated to the electromagnetic sounding zone/volume 1601 and the mapped topology of the electromagnetic sounding zone/volume 1601 (e.g., the features of the working environment are taught to the robot arm 1532 as described herein). The controller 1533 is configured to plan robot arm 1532 trajectories (FIG. 10, Block 1010) and to plan changes in form (as described herein) of the electromagnetic affection envelope 1600 (e.g., affection envelope planning) (FIG. 10, Block 1020) based on movement constraints and object locations (e.g., collaborative objects, labware, etc. of the working environment) as determined from the mapped topology data. Examples of trajectory planning effected by object/collaborative object entry into the electromagnetic sounding zone/volume 1601 and/or electromagnetic affection envelope 1600 include, but are not limited to changes in robot arm 1532 motion characteristics (e.g., slowing/stopping of arm velocity and/or acceleration, moving the arm in an alternate trajectory away from the detected object, changing/decreasing the motor torque, etc.).

As described herein, the electromagnetic affection envelope 1600 is close coupled to the robot arm 1532 and is adaptive to motion of the robot arm 1532. The electromagnetic affection envelope 1600 is also interactive with the electromagnetic sounding zone/volume 1601 so as to be dynamic with respect to changes in collaborative object pose as registered by/in the electromagnetic sounding zone/volume 1601. As also described herein the controller 1533 is configured to selectably switch from the electromagnetic sounding zone/volume 1601 to the electromagnetic affection envelope 1600 and modify characteristics of the electromagnetic affection envelope 1600 based on data obtained from the electromagnetic sounding zone/volume 1601.

Referring to FIGS. 5-8, an exemplary method for a robotic transport system will be described in accordance with aspects of the present disclosure. The robot arm 1532 is provided (FIG. 7, Block 800) and is operably coupled to the drive section 1531 so as to provide the robot arm 1532 with arm motion in at least one axis of motion moving at least a portion (e.g., articulated arm portion(s) 1504) of the robot arm 1532 in the collaborative space SPC from the first location, in which the robot arm 1532 has a first shape, to another different location of at least the portion 1504 of the robot arm 1532 in the collaborative space SPC in which the robot arm 1532 has another different shape. An electromagnetic affection envelope 1600 is generated (FIG. 8, Block 810), with electromagnetic emitters 1501 borne by the robot arm 1532, so that the electromagnetic affection envelope 1600 is defined by the robot arm 1532 and is close coupled and substantially conformal to at least part of a dynamic contour of each different arm shape of the articulated arm with one or more of at least the portion 1504 of the robot arm 1532 moving from the first location to the other different location, and the robot arm 1532 changing shape from the first shape to the other different shape. In response to detection of entry of a collaborative object, due at least in part to motion of at least the portion 1504 of the robot arm 1532, into the electromagnetic affection envelope 1600, commanding, with the controller 1533 coupled to the drive section 1531, a change in at least one predetermined characteristic of the arm motion (FIG. 8, Block 820). In one aspect, reflected emissions are received (FIG. 8, Block 830), with receivers 1501, 1502A (or receiver of emitter receiver 1503) disposed in the collaborative space SPC, and sensing therefrom the collaborative object in the electromagnetic affection envelope. The controller 1533 selects the change in the at least one predetermined characteristic of the arm motion to avoid or prevent contact between the robot arm and the collaborative object (FIG. 8, Block 840).

In accordance with one or more aspects of the present disclosure a robotic transport system comprises:
- a frame;
- a drive section connected to the frame;
- an articulated arm operably coupled to the drive section providing the articulated arm with arm motion in at least one axis of motion moving at least a portion of the articulated arm in a collaborative space, corresponding to the frame, from a first location, in which the articulated arm has a first shape, to another different location of at least the portion of the articulated arm in the collaborative space in which the articulated arm has another different shape;
- an electromagnetic affection envelope, generated by electromagnetic emitters, borne by the articulated arm so that the electromagnetic affection envelope is defined by the articulated arm and is close coupled and substantially conformal to at least part of a dynamic contour of each different arm shape of the articulated arm with one or more of at least the portion of the articulated arm moving from the first location to the other different location, and the articulated arm changing shape from the first shape to the other different shape; and
- a controller communicably connected to the drive section and configured so that in response to detection of entry of a collaborative object, due at least in part to motion of at least the portion of the articulated arm, into the electromagnetic affection envelope, the controller commands a change in at least one predetermined characteristic of the arm motion.

In accordance with one or more aspects of the present disclosure the at least one predetermined characteristic of the arm motion is at least one of a curve of a path, a shape of a trajectory,
- a kinematic parameter, and a dynamic parameter of at least the portion of the articulated arm in motion from the first location to the other different location.

In accordance with one or more aspects of the present disclosure the change in the at least one predetermined characteristic of the arm motion is selected to avoid or prevent contact between the articulated arm and the collaborative object.

In accordance with one or more aspects of the present disclosure the electromagnetic emitters are millimeter wave radar emitters mounted to articulated sections of the articulated arm.

In accordance with one or more aspects of the present disclosure the electromagnetic affection envelope is defined by a network of millimeter wave radar beams generated by the electromagnetic emitters that are disposed on more than one articulated sections of the articulated arm.

In accordance with one or more aspects of the present disclosure each articulated section of the articulated arm with different kinematic motion has more than one millimeter wave radar sensor forming at least part of a multitude of sensors forming the network of millimeter wave radar beams.

In accordance with one or more aspects of the present disclosure the controller is programmed so that a depth of the electromagnetic affection envelope between a set outermost detection boundary of the electromagnetic affection envelope and the articulated arm is selectably variable dependent on a predetermined characteristic of at least the portion of the articulated arm in motion.

In accordance with one or more aspects of the present disclosure the controller is programmed so that a depth of the electromagnetic affection envelope between a set outermost detection boundary of the electromagnetic affection envelope and the articulated arm is dynamically variable dependent on a predetermined characteristic of at least the portion of the articulated arm in motion.

In accordance with one or more aspects of the present disclosure the robot transport system further comprises receivers disposed in the collaborative space so as to receive reflected emissions and sense therefrom the collaborative object in the electromagnetic affection envelope.

In accordance with one or more aspects of the present disclosure output data from the receivers is processed by the controller implementing a neural network.

In accordance with one or more aspects of the present disclosure a robotic transport system comprises:
- a frame;
- a drive section connected to the frame;
- an articulated arm operably coupled to the drive section providing the articulated arm with arm motion in at least one axis of motion moving at least a portion of the articulated arm in a collaborative space, corresponding to the frame, from a first location, in which the articulated arm has a first shape, to another different location of at least the portion of the articulated arm in the collaborative space in which the articulated arm has another different shape;
- an electromagnetic affection envelope, generated by a network of electromagnetic sounding waves from electromagnetic emitters, on the articulated arm so that contours, of the electromagnetic affection envelope, set at a predetermined range limit from the articulated arm are defined dynamically by the articulated arm and substantially correspond to each different arm shape of the articulated arm with one or more of at least the portion of the articulated arm moving from the first location to the other different location, and the articulated arm changing shape from the first shape to the other different shape; and
- a controller communicably connected to the drive section and configured so that in response to detection of entry of a collaborative object, due at least in part to motion of at least the portion of the articulated arm, through the contours into the electromagnetic affection envelope, the controller commands a change in at least one predetermined characteristic of the arm motion.

In accordance with one or more aspects of the present disclosure the at least one predetermined characteristic of the arm motion is at least one of a curve of a path, a shape of a trajectory, a kinematic parameter, and a dynamic parameter of at least the portion of the articulated arm in motion from the first location to the other different location.

In accordance with one or more aspects of the present disclosure the change in the at least one predetermined characteristic of the arm motion is selected to avoid or prevent contact between the articulated arm and the collaborative object.

In accordance with one or more aspects of the present disclosure the electromagnetic emitters are millimeter wave radar emitters mounted to articulated sections of the articulated arm.

In accordance with one or more aspects of the present disclosure the electromagnetic affection envelope is defined by a network of millimeter wave radar beams generated by the electromagnetic emitters that are disposed on more than one articulated sections of the articulated arm.

In accordance with one or more aspects of the present disclosure each articulated section of the articulated arm with different kinematic motion has more than one millimeter wave radar sensor forming at least part of a multitude of sensors forming the network of millimeter wave radar beams.

In accordance with one or more aspects of the present disclosure the controller is programmed so that a depth of the electromagnetic affection envelope between a set outermost detection boundary of the electromagnetic affection envelope and the articulated arm is selectably variable dependent on a predetermined characteristic of at least the portion of the articulated arm in motion.

In accordance with one or more aspects of the present disclosure the controller is programmed so that a depth of the electromagnetic affection envelope between a set outermost detection boundary of the electromagnetic affection envelope and the articulated arm is dynamically variable dependent on a predetermined characteristic of at least the portion of the articulated arm in motion.

In accordance with one or more aspects of the present disclosure the robot transport system further comprises receivers disposed in the collaborative space so as to receive reflected emissions and sense therefrom the collaborative object in the electromagnetic affection envelope.

In accordance with one or more aspects of the present disclosure output data from the receivers is processed by the controller implementing a neural network.

In accordance with one or more aspects of the present disclosure the robotic transport system comprises:
 a frame;
 a drive section connected to the frame;
 an articulated arm operably coupled to the drive section providing the articulated arm with arm motion in at least one axis of motion moving at least a portion of the articulated arm in a collaborative space, corresponding to the frame, from a first location, to another different location of at least the portion of the articulated arm in the collaborative space;
 a multitude of millimeter wave radar sensors distributed on at least the portion of the articulated arm and oriented so as to radar sound the collaborative space in each direction, away from the articulated arm, substantially aligned with each direction component of motion of each of at least the portion of the articulated arm moving from the first location to the other different location; and
 a controller communicably connected to the millimeter wave radar sensors so as to selectably activate the millimeter wave radar sensors and select a radar emission direction from a number of independently selectable radar emission directions defined by the millimeter wave radar sensors based on at least one direction component of motion of at least the portion of the articulated arm moving, and configured so that in response to detection, from radar emission by selected ones of the millimeter wave radar sensors, of approach of an object, in the collaborative space relative to at least the portion of the articulated arm moving, command the drive section affecting a predetermined kinematic or dynamic characteristic of motion of at least the portion of the articulated arm moving.

In accordance with one or more aspects of the present disclosure the selected radar emission direction sounds a dynamically selected limited region of the collaborative space limited so as to be defined by directions substantially aligned with each of the at least one direction component of motion.

In accordance with one or more aspects of the present disclosure the selected limited region of the collaborative space corresponds substantially in entirety to each of the at least one direction component of motion, so that each of the at least the portion of the articulated arm moving, through each arm position, from the first location to the other different location traverses through the selected limited region of the collaborative space substantially in entirety.

In accordance with one or more aspects of the present disclosure the millimeter wave radar sensors are linked to the controller via a controller area network or an EtherCAT® network.

In accordance with one or more aspects of the present disclosure the articulated arm has a first shape with at least the portion of the articulated arm at the first location.

In accordance with one or more aspects of the present disclosure with at least the portion of the articulated arm at the other different location, the articulated arm has another different shape that is different from the first shape.

In accordance with one or more aspects of the present disclosure the multitude of millimeter wave radar sensors are dependent from at least the portion of the articulated arm.

In accordance with one or more aspects of the present disclosure a method for a robotic transport system, the method comprises:
 providing an articulated arm operably coupled to a drive section so as to provide the articulated arm with arm motion in at least one axis of motion moving at least a portion of the articulated arm in a collaborative space from a first location, in which the articulated arm has a first shape, to another different location of at least the portion of the articulated arm in the collaborative space in which the articulated arm has another different shape;
 generating, with electromagnetic emitters borne by the articulated arm, an electromagnetic affection envelope so that the electromagnetic affection envelope is defined by the articulated arm and is close coupled and substantially conformal to at least part of a dynamic contour of each different arm shape of the articulated arm with one or more of at least the portion of the articulated arm moving from the first location to the other different location, and the articulated arm changing shape from the first shape to the other different shape; and in response to detection of entry of a collaborative object, due at least in part to motion of at least the portion of the articulated arm, into the electromagnetic affection envelope, commanding, with a controller coupled to the drive section, a change in at least one predetermined characteristic of the arm motion.

In accordance with one or more aspects of the present disclosure the at least one predetermined characteristic of the arm motion is at least one of a curve of a path, a shape of a trajectory, a kinematic parameter, and a dynamic parameter of at least the portion of the articulated arm in motion from the first location to the other different location.

In accordance with one or more aspects of the present disclosure the method further comprises, selecting, with the controller, the change in the at least one predetermined characteristic of the arm motion to avoid or prevent contact between the articulated arm and the collaborative object.

In accordance with one or more aspects of the present disclosure the electromagnetic emitters are millimeter wave radar emitters mounted to articulated sections of the articulated arm.

In accordance with one or more aspects of the present disclosure the electromagnetic affection envelope is defined by a network of millimeter wave radar beams generated by the electromagnetic emitters that are disposed on more than one articulated sections of the articulated arm.

In accordance with one or more aspects of the present disclosure each articulated section of the articulated arm with different kinematic motion has more than one millimeter wave radar sensor forming at least part of a multitude of sensors forming the net of millimeter wave radar beams.

In accordance with one or more aspects of the present disclosure the controller is programmed so that a depth of the electromagnetic affection envelope between a set outermost detection boundary of the electromagnetic affection envelope and the articulated arm is selectably variable dependent on a predetermined characteristic of at least the portion of the articulated arm in motion.

In accordance with one or more aspects of the present disclosure the controller is programmed so that a depth of the electromagnetic affection envelope between a set outermost detection boundary of the electromagnetic affection envelope and the articulated arm is dynamically variable dependent on a predetermined characteristic of at least the portion of the articulated arm in motion.

In accordance with one or more aspects of the present disclosure the method further comprises receiving, with receivers disposed in the collaborative space, reflected emissions and sensing therefrom the collaborative object in the electromagnetic affection envelope.

In accordance with one or more aspects of the present disclosure the receivers are connected to the controller by a neural network.

In accordance with one or more aspects of the present disclosure a robotic transport system comprises:
a cart-borne articulated arm having:
a frame;
a drive section connected to the frame;
articulated arm portions operably coupled to the drive section providing the cart-borne articulated arm with arm motion in at least one axis of motion moving at least a portion of the articulated arm portions in a collaborative space, corresponding to a selectably variable cart location of the cart-borne articulated arm, from a first location, in which the cart-borne articulated arm has a first shape, to another different location of at least the portion of the articulated arm portions in the collaborative space in which the cart-borne articulated arm has another different shape;

an electromagnetic affection envelope, generated by electromagnetic emitters, borne by the cart-borne articulated arm so that the electromagnetic affection envelope is defined by the cart-borne articulated arm and is close coupled and substantially conformal to at least a dynamic contour portion of each different arm shape of the cart-borne articulated arm with one or more of at least the portion of the articulated arm portions moving from the first location to the other different location, and the cart-borne articulated arm changing shape from the first shape to the other different shape; and a controller communicably connected to electromagnetic sensors operative with the electromagnetic affection envelope to detect entry of a collaborative object into the electromagnetic affection envelope, and communicably connected to sensors operative with an electromagnetic sounding region, different than the electromagnetic affection envelope, and covering the collaborative space substantially in entirety.

In accordance with one or more aspects of the present disclosure the electromagnetic sounding region is separate and distinct from the electromagnetic affection envelope and encompasses the electromagnetic affection envelope substantially in entirety for each different cart-borne articulated arm shape and each location of the cart-borne articulated arm in the collaborative space.

In accordance with one or more aspects of the present disclosure the electromagnetic sounding region is defined by at least one of the electromagnetic emitters borne by the cart-borne articulated arm.

In accordance with one or more aspects of the present disclosure the electromagnetic sounding region is defined by at least another electromagnetic emitter different than the electromagnetic emitters borne by the cart-borne articulated arm.

In accordance with one or more aspects of the present disclosure the different electromagnetic emitter is mounted on a cart bearing the cart-borne articulated arm.

In accordance with one or more aspects of the present disclosure the controller is communicably connected to the drive section and configured so that in response to detection of entry of a collaborative object, due at least in part to motion of at least the portion of the articulated arm portions, into the electromagnetic affection envelope, the controller commands a change in at least one predetermined characteristic of arm motion.

In accordance with one or more aspects of the present disclosure a robotic transport system comprises:
a cart-borne articulated arm having:
a frame;
a drive section connected to the frame;
articulated arm portions operably coupled to the drive section providing the cart-borne articulated arm with arm motion in at least one axis of motion moving at least a portion of the articulated arm portions in a collaborative space, corresponding to a selectably variable cart location of the cart-borne articulated arm, from a first location, in which the cart-borne articulated arm has a first shape, to another different location of at least the portion of the articulated arm portions in the collaborative space in which the cart-borne articulated arm has another different shape;

an electromagnetic sounding zone, generated by electromagnetic emitters, borne by the cart-borne articulated arm configured to cover a predetermined volume of the collaborative space so that a collaborative object in the predetermined volume is detected with a sensor cooperative with the electromagnetic emitters, and an electromagnetic affection envelope, generated by the electromagnetic emitters so that the electromagnetic affection envelope is defined by the cart-borne articulated arm and is close coupled and substantially conformal to at least a dynamic contour part of each different arm shape of the cart-borne articulated arm with one or more of at least the portion of the cart-borne articulated arm moving from the first location to the other different location, and the cart-borne articulated arm changing shape from the first shape to the other different shape; and a controller communicably connected to the sensor to detect presence of the collaborative object in the predetermined volume, and communicably connected with the electromagnetic emitters and configured so as to dynamically form the electromagnetic affection envelope based on detection of the collaborative object presence.

In accordance with one or more aspects of the present disclosure the controller is communicably connected to the sensor, that is operative with the electromagnetic affection envelope, to detect entry of the collaborative object into the electromagnetic affection envelope, and the controller is communicably connected to the drive section and configured so that in response to detection of entry of the collaborative object into the electromagnetic affection envelope, the controller commands a change in at least one predetermined characteristic of the arm motion.

In accordance with one or more aspects of the present disclosure the controller dynamically forms bounds of the electromagnetic affection envelope based on detection of the collaborative object presence.

In accordance with one or more aspects of the present disclosure the controller dynamically changes the form of the bounds of the electromagnetic affection envelope based on detection of the collaborative object presence.

In accordance with one or more aspects of the present disclosure the controller is communicably connected to the sensor that is operative with the electromagnetic sounding zone and the controller is configured to register a change in the presence of the collaborative object in the sounding zone, and in response to the registered change dynamically alter a form of the electromagnetic affection envelope.

In accordance with one or more aspects of the present disclosure the controller changes the form of the electromagnetic affection envelope based on a direction defined by the registered change in presence as related to a direction of motion or planned direction of motion of the at least the portion of the articulated arm portions moving.

In accordance with one or more aspects of the present disclosure the emitters and sensor are common to and operative with both the electromagnetic sounding zone and the electromagnetic affection envelope and the controller is configured to selectably switch between generation of the electromagnetic sounding zone and generation of the electromagnetic affection envelope.

In accordance with one or more aspects of the present disclosure the controller is configured to selectably generate the electromagnetic sounding zone so as to map topology characteristics of the predetermined volume associated with planning a move of the cart-borne articulated arm moving at least the portion of the articulated arm portions to or from at least one of the first location and the other different location.

In accordance with one or more aspects of the present disclosure mapping data defines a basis for trajectory planning of at least the portion of the articulated arm portions moving.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A robotic transport system comprising:
   a carriage-borne articulated arm having;
      a frame;
      a drive section connected to the frame;
      articulated arm portions operably coupled to the drive section providing the carriage-borne articulated arm with arm motion in at least one axis of motion moving at least a portion of the articulated arm portions in a collaborative space, corresponding to a selectably variable carriage location of the carriage-borne articulated arm, from a first location, to another different location of at least the portion of the articulated arm portions in the collaborative space;
      an electromagnetic affection envelope, generated by electromagnetic emitters, borne by the carriage-borne articulated arm so that the electromagnetic affection envelope is defined by the carriage-borne articulated arm and is close coupled and substantially conformal to at least a dynamic contour portion of each different arm shape of the carriage-borne articulated arm with at least the portion of the articulated arm portions moving from the first location to the other different location; and
      a controller communicably connected to electromagnetic sensors operative with the electromagnetic affection envelope to detect entry of a collaborative object into the electromagnetic affection envelope, and communicably connected to sensors operative with an electromagnetic sounding region, different than the electromagnetic affection envelope, and covering the collaborative space substantially in entirety.

2. The robotic transport system of claim 1, wherein the carriage-borne articulated arm has a first shape at the first location.

3. The robotic transport system of claim 1, wherein the carriage-borne articulated arm has another different shape at the other different location.

4. The robotic transport system of claim 3, wherein the electromagnetic affection envelope is close coupled and substantially conformal to at least the dynamic contour portion of each different arm shape with the carrier borne articulated arm changing shape from a first shape to another different shape.

5. The robotic transport system of claim 1, wherein the electromagnetic sounding region is separate and distinct from the electromagnetic affection envelope and encompasses the electromagnetic affection envelope substantially in entirety for each different carriage-borne articulated arm shape and each location of the carriage-borne articulated arm in the collaborative space.

6. The robotic transport system of claim 1, wherein the electromagnetic sounding region is defined by at least one of the electromagnetic emitters borne by the carriage-borne articulated arm.

7. The robotic transport system of claim 1, wherein the electromagnetic sounding region is defined by at least another electromagnetic emitter different than the electromagnetic emitters borne by the carriage-borne articulated arm.

8. The robotic transport system of claim 7, wherein the different electromagnetic emitter is mounted on a carriage bearing the carriage-borne articulated arm.

9. The robotic transport system of claim 1, wherein the controller is communicably connected to the drive section and configured so that in response to detection of entry of a collaborative object, due at least in part to motion of at least the portion of the articulated arm portions, into the electromagnetic affection envelope, the controller commands a change in at least one predetermined characteristic of arm motion.

10. A robotic transport system comprising:
a carriage-borne articulated arm having;
  a frame;
  a drive section connected to the frame;
  articulated arm portions operably coupled to the drive section providing the carriage-borne articulated arm with arm motion in at least one axis of motion moving at least a portion of the articulated arm portions in a collaborative space, corresponding to a selectably variable carriage location of the carriage-borne articulated arm, from a first location, to another different location of at least the portion of the articulated arm portions in the collaborative space;
  an electromagnetic sounding zone, generated by electromagnetic emitters, borne by the carriage-borne articulated arm configured to cover a predetermined volume of the collaborative space so that a collaborative object in the predetermined volume is detected with a sensor cooperative with the electromagnetic emitters, and an electromagnetic affection envelope, generated by the electromagnetic emitters so that the electromagnetic affection envelope is defined by the carriage-borne articulated arm and is close coupled and substantially conformal to at least a dynamic contour part of each different arm shape of the carriage-borne articulated arm with at least the portion of the carriage-borne articulated arm moving from the first location to the other different location; and
  a controller communicably connected to the sensor to detect presence of the collaborative object in the predetermined volume, and communicably connected with the electromagnetic emitters and configured so as to dynamically form the electromagnetic affection envelope based on detection of the collaborative object presence.

11. The robotic transport system of claim 10, wherein the carriage-borne articulated arm has a first shape at the first location.

12. The robotic transport system of claim 10, wherein the carriage-borne articulated arm has another different shape at the other different location.

13. The robotic transport system of claim 12, wherein the electromagnetic affection envelope is close coupled and substantially conformal to at least the dynamic contour portion of each different arm shape with the carrier borne articulated arm changing shape from a first shape to another different shape.

14. The robotic transport system of claim 10, wherein the controller is communicably connected to the sensor, that is operative with the electromagnetic affection envelope, to detect entry of the collaborative object into the electromagnetic affection envelope, and the controller is communicably connected to the drive section and configured so that in response to detection of entry of the collaborative object into the electromagnetic affection envelope, the controller commands a change in at least one predetermined characteristic of the arm motion.

15. The robotic transport system of claim 10, wherein the controller dynamically forms bounds of the electromagnetic affection envelope based on detection of the collaborative object presence.

16. The robotic transport system of claim 15, wherein the controller dynamically changes the form of the bounds of the electromagnetic affection envelope based on detection of the collaborative object presence.

17. The robotic transport system of claim 10, wherein the controller is communicably connected to the sensor that is operative with the electromagnetic sounding zone and the controller is configured to register a change in the presence of the collaborative object in the sounding zone, and in response to the registered change dynamically alter a form of the electromagnetic affection envelope.

18. The robotic transport system of claim 17, wherein the controller changes the form of the electromagnetic affection envelope based on a direction defined by the registered change in presence as related to a direction of motion or planned direction of motion of the at least the portion of the articulated arm portions moving.

19. The robotic transport system of claim 10, wherein the electromagnetic emitters and sensor are common to and operative with both the electromagnetic sounding zone and the electromagnetic affection envelope and the controller is configured to selectably switch between generation of the electromagnetic sounding zone and generation of the electromagnetic affection envelope.

20. The robotic transport system of claim 10, wherein the controller is configured to selectably generate the electromagnetic sounding zone so as to map topology characteristics of the predetermined volume associated with planning a move of the carriage-borne articulated arm moving at least the portion of the articulated arm portions to or from at least one of the first location and the other different location.

21. The robotic transport system of claim 20, wherein mapping data defines a basis for trajectory planning of at least the portion of the articulated arm portions moving.

* * * * *